(12) United States Patent
Hughes et al.

(10) Patent No.: US 9,965,141 B2
(45) Date of Patent: May 8, 2018

(54) MOVABLE SELECTION INDICATORS FOR REGION OR POINT SELECTION ON A USER INTERFACE

(71) Applicant: Apple Inc., Cupertino, CA (US)

(72) Inventors: Gregory F. Hughes, Cupertino, CA (US); Christopher Brian Fleizach, Morgan Hill, CA (US); Eric T. Seymour, Cupertino, CA (US); Darren C. Minifie, Cupertino, CA (US); Patti Pei-Chin Hoa, San Jose, CA (US)

(73) Assignee: Apple Inc., Cupertino, CA (US)

( * ) Notice: Subject to any disclaimer, the term of this patent is extended or adjusted under 35 U.S.C. 154(b) by 591 days.

(21) Appl. No.: 14/501,885

(22) Filed: Sep. 30, 2014

(65) Prior Publication Data

US 2015/0355813 A1 Dec. 10, 2015

Related U.S. Application Data

(60) Provisional application No. 62/009,138, filed on Jun. 6, 2014.

(51) Int. Cl.
*G06F 3/00* (2006.01)
*G06F 3/0481* (2013.01)
(Continued)

(52) U.S. Cl.
CPC ........ *G06F 3/04812* (2013.01); *G06F 3/0482* (2013.01); *G06F 3/0484* (2013.01);
(Continued)

(58) Field of Classification Search
None
See application file for complete search history.

(56) References Cited

U.S. PATENT DOCUMENTS

2010/0239222 A1* 9/2010 Bhogal .............. H04N 5/44513
348/563
2012/0010995 A1* 1/2012 Skirpa ................... G06F 3/0481
705/14.49

(Continued)

OTHER PUBLICATIONS

Daniel Bajic et al., Toward a generalized theory of the shift to retrieval in cognitive skill learning, May 26, 2011, Springer, pp. 1-16 (Year: 2011).*

(Continued)

*Primary Examiner* — Tam T Tran
(74) *Attorney, Agent, or Firm* — Ronald Fernando

(57) ABSTRACT

Methods, systems, and user interfaces enable users identify a user-selected location of a user interface with reduced movement and motor effort. A first selection indicator is overlaid on the user interface and moved in a first direction. Responsive to receiving a first user input to stop movement of the first selection indicator, movement of the first selection indicator is ceased over a first location of the user interface. A second selection indicator is overlaid on the user interface and the second selection indicator is moved in a second direction. Responsive to receiving a second user input to stop movement of the second selection indicator, movement of the second selection indicator is ceased over a second location of the user interface. The user-selected location of the user interface is selected based at least in part on the first and the second locations of the user interface.

18 Claims, 29 Drawing Sheets

(51) Int. Cl.
*G06F 3/0484* (2013.01)
*G06F 3/0482* (2013.01)
G06Q 10/10 (2012.01)
H04L 29/06 (2006.01)

(52) U.S. Cl.
CPC ........ *G06F 3/0481* (2013.01); *G06F 3/04842* (2013.01); *G06Q 10/10* (2013.01); *H04L 29/06* (2013.01)

(56) References Cited

U.S. PATENT DOCUMENTS

| 2013/0067315 A1* | 3/2013 | Rakow ................ G06F 3/04886 715/234 |
| 2013/0212522 A1* | 8/2013 | Fleizach ............... G06F 3/0488 715/784 |
| 2014/0204035 A1* | 7/2014 | Chang .................. G06F 3/0416 345/173 |

OTHER PUBLICATIONS

Yuanwei Lao et al., Sequential Particle Generation for Visual Tracking, Sep. 2009, IEEE, vol. 19, No. 9 (Year: 2009).*

* cited by examiner

200

Displaying a first region overlaid on a user interface (UI)
210

Moving the first region in a first direction
220

Ceasing movement of the first region over the first portion of the UI
230

Displaying a selection indicator overlaid on the UI
240

Moving the selection indicator in a second direction
250

Ceasing movement of the selection indicator over the second portion of the UI
260

Determining selected portion based on the first and the second portions
270

FIG. 2

MOVABLE SELECTION INDICATORS FOR REGION OR POINT SELECTION ON A USER INTERFACE

CROSS-REFERENCE TO RELATED APPLICATION

This application claims priority under 35 U.S.C. § 119(e) from U.S. Provisional Patent Application No. 62/009,138, entitled "Movable Selection Indicators for Region or Point Selection On a User Interface," filed on Jun. 6, 2014, which is incorporated by reference herein in its entirety.

BACKGROUND

1. Field of Technology

The embodiments relate to assistive or accessibility technology for users of computing devices. More particularly, the embodiments relate to methods, systems, and user interfaces for enabling such users to interact with user interfaces while sustaining reduced movement and motor effort.

2. Background

Users interact with desktop computers, laptops, smart phones, tablet computers, and other computing devices, using a variety of user input devices, such as keyboards, mice, touchscreens, trackpads, joysticks, and the like. These user input devices require a considerable amount hand movement and reasonable motor effort. While well-suited, convenient, and efficient for users with normal and healthy motor functions, these user input devices are frequently cumbersome and place intense physical strain on, and physical pain to users with or prone to motor dysfunction, impairment, or disability or for children with limited motor abilities.

SUMMARY

According to some embodiments, methods, systems, and user interfaces for assistive technology enable users to interact with computing devices with reduced movement. The computing device enables a user to select locations (e.g., positions, spatial coordinates, areas, regions, portions) of a user interface or user interface elements at or in the vicinity of selected locations on the user interface by providing moving selection indicators that traverse or scan regions or areas of the user interface. When the moving selection indicator is at or near a user-desired location (e.g., position or region) or element of the user interface, the user can instruct the computing device to stop movement of the moving selection indicator at or near the user-desired location (e.g., position or region) of the user interface, with a simple and convenient user input (e.g., a single click on an assistive device or panel communicatively coupled to the computing device, or using a single switch), thereby indicating selection of the user-desired location (e.g., position or region). This approach obviates a need for the user to physically move a mouse or cursor (using a track pad, touchscreen, or joystick) in order to identify, select, or otherwise interact with the user interface.

A method of determining a user-selected portion of a user interface comprises displaying a first selection indicator overlaid on the user interface and moving the first selection indicator in a first direction. The first selection indicator can have a variety of different shapes or forms. In one embodiment, the first selection indicator is a rectangular visually distinguished region extending between a pair of parallel edges and the first direction is orthogonal to the pair of parallel edges of the rectangular visually distinguished region. Alternatively, the first selection indicator is a polygonal visually distinguished region having a pair of parallel edges oriented at a specified angle to a long axis of the user interface and the first direction is orthogonal to the pair of parallel edges of the polygonal visually distinguished region. The first selection indicator is, optionally, an angular wedge bounded by a pair of radial edges extending from a given location on the user interface and being at a specified angle to each other, and movement of the first selection indicator corresponds to a rotation of the angular wedge around the given location. In another embodiment, the first selection indicator is an annular visually distinguished region bounded by a pair of concentrically arranged circles and movement of the first selection indicator comprises a radial movement of the at least one circle of the pair of circles toward or away from a central location of the annular visually distinguished region, the radial movement based on varying a radius of the at least one circle.

Responsive to receiving a first user input to stop movement of the first selection indicator, the method further comprises ceasing movement of the first selection indicator over a first location (e.g., position or region) of the user interface. While displaying the first selection indicator over the first location (e.g., position or region) of the user interface, the method additionally comprises: displaying a second selection indicator overlaid on the user interface, moving the second selection indicator in a second direction, and responsive to receiving a second user input to stop movement of the second selection indicator, ceasing movement of the second selection indicator over a second location (e.g., position or region) of the user interface. The method further comprises determining the user-selected portion of the user interface based at least in part on the first and the second locations of the user interface.

In some embodiments, if the device does not detect the first user input to stop movement of the first selection indicator and, in the meantime, if the first selection indicator approaches a boundary, edge or perimeter of the user interface, then the direction of movement of the first selection indicator is reversed. Accordingly, in some embodiments, while moving the first selection indicator in the first direction, prior to receiving the first user input, the method comprises determining that a respective edge of the first selection indicator is within a first specified distance of a boundary of the user interface. Responsive to the determining, the method comprises reversing movement of the first selection indicator on the user interface, by moving a displayed portion of the first selection indicator in a direction opposite to the first direction.

In another embodiment, the second selection indicator comprises a line lying within a region associated with the first location. For example, the second selection indicator comprises a straight line parallel to the parallel edges of the rectangular visually distinguished region; or a radial line lying between the radial edges of the angular wedge; or an additional circle lying within the annular region. In such embodiments, the method further comprises moving a third selection indicator along a movement trajectory defined by the line. Responsive to receiving a third user input to stop movement of the third selection indicator, the method comprises ceasing movement of the third selection indicator over a third location of the user interface. In such embodiments, the method also comprises determining the user-selected location of the user interface based at least in part on the third location of the user interface.

Note that the various embodiments of the assistive scanning methods and applications described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and has not necessarily been selected to delineate or circumscribe the inventive subject matter.

FIB. 1C is a high-level block diagram of a user selection module, according to some embodiments.

FIG. 2 includes a flow chart illustrating a method for location (e.g., position, point, or region) selection using moving selection indicators, for use with assistive scanning software, according to some embodiments.

Figure 3A:
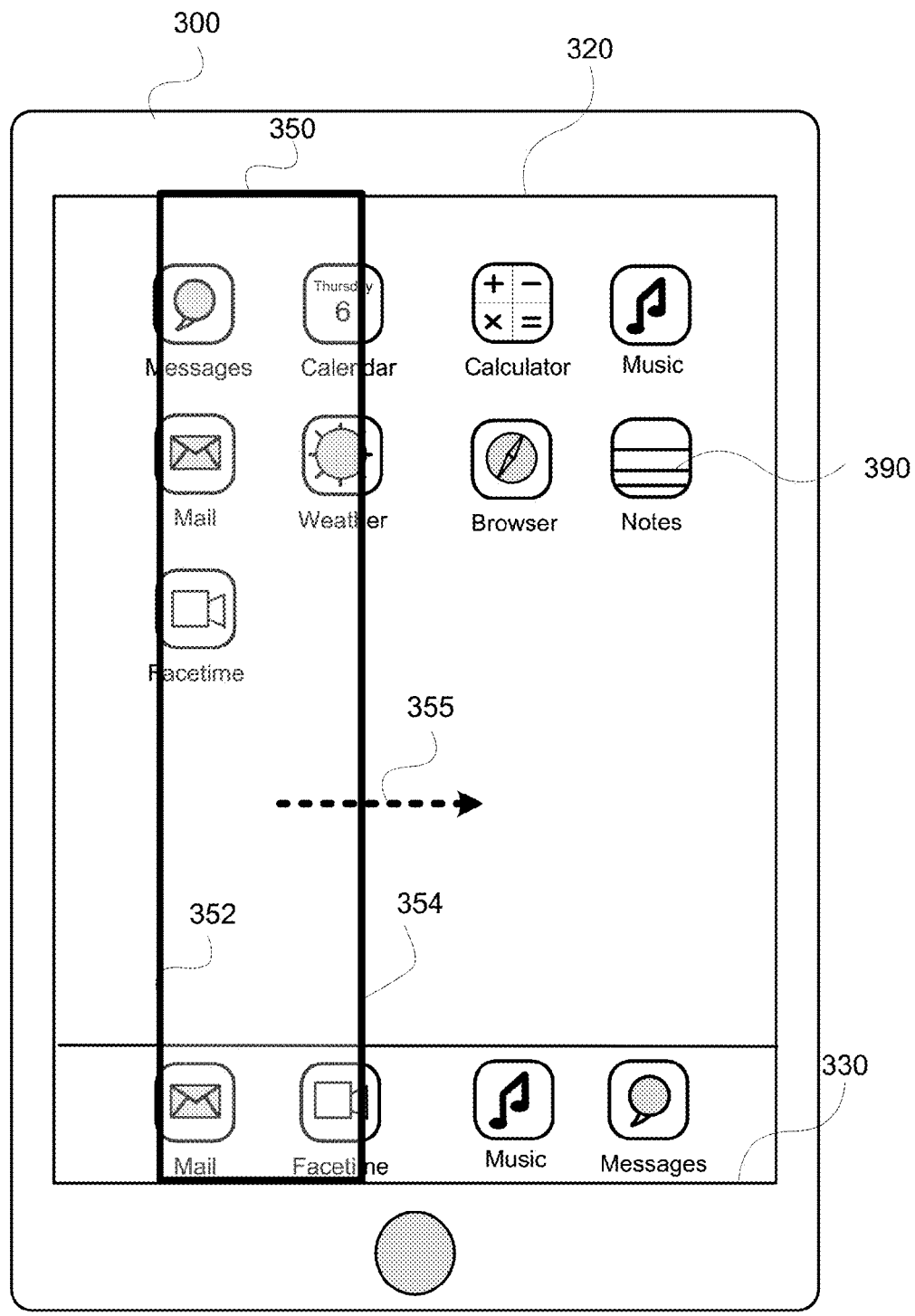

FIG. 3A includes user interfaces illustrating rectangular moving visually distinguished regions for location (e.g., position, point, or region) selection, for use with assistive scanning software, according to some embodiments.

Figure 3B:
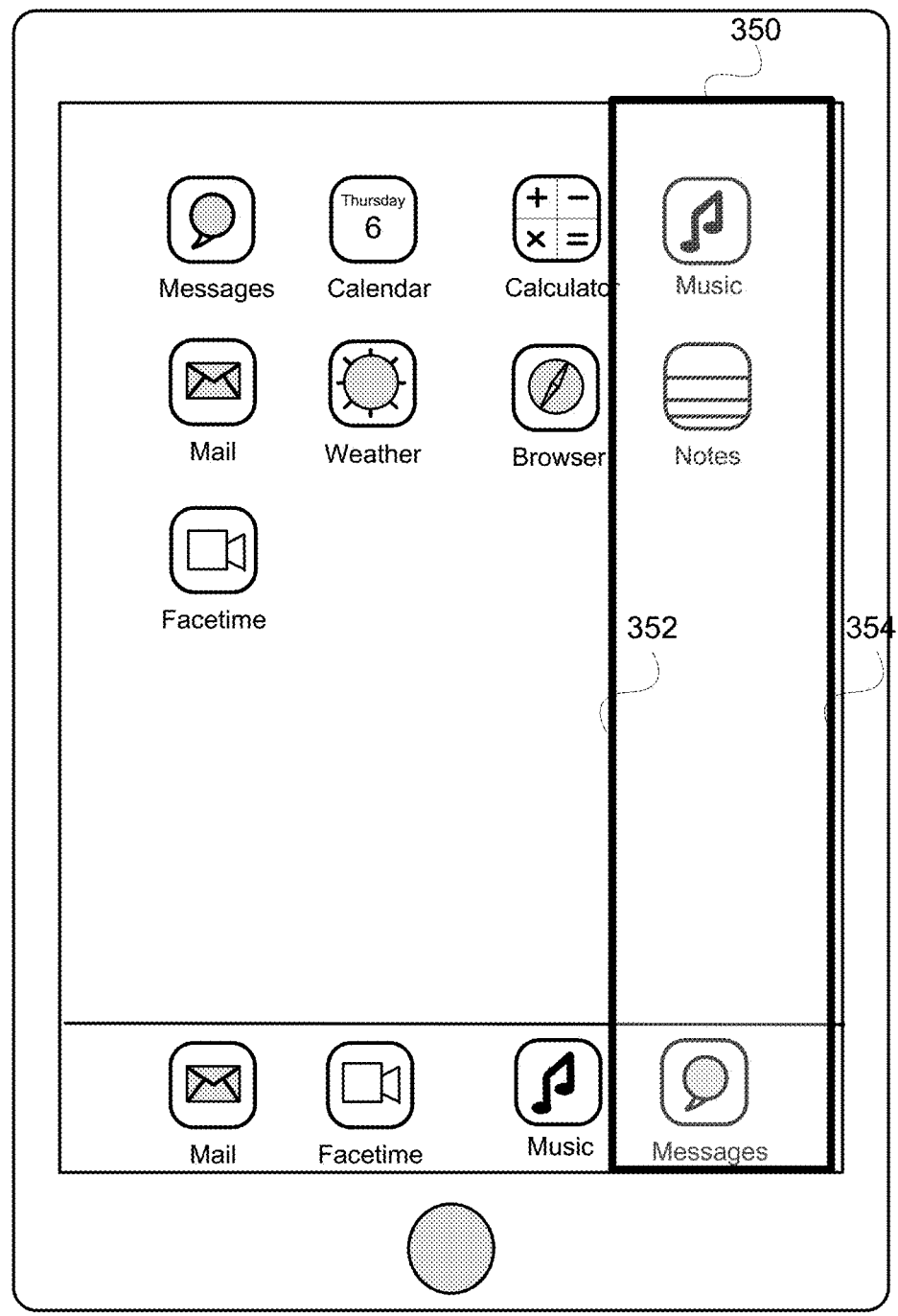

FIG. 3B includes user interfaces illustrating rectangular moving visually distinguished regions for location (e.g., position, point, or region) selection, for use with assistive scanning software, according to some embodiments.

Figure 3C:
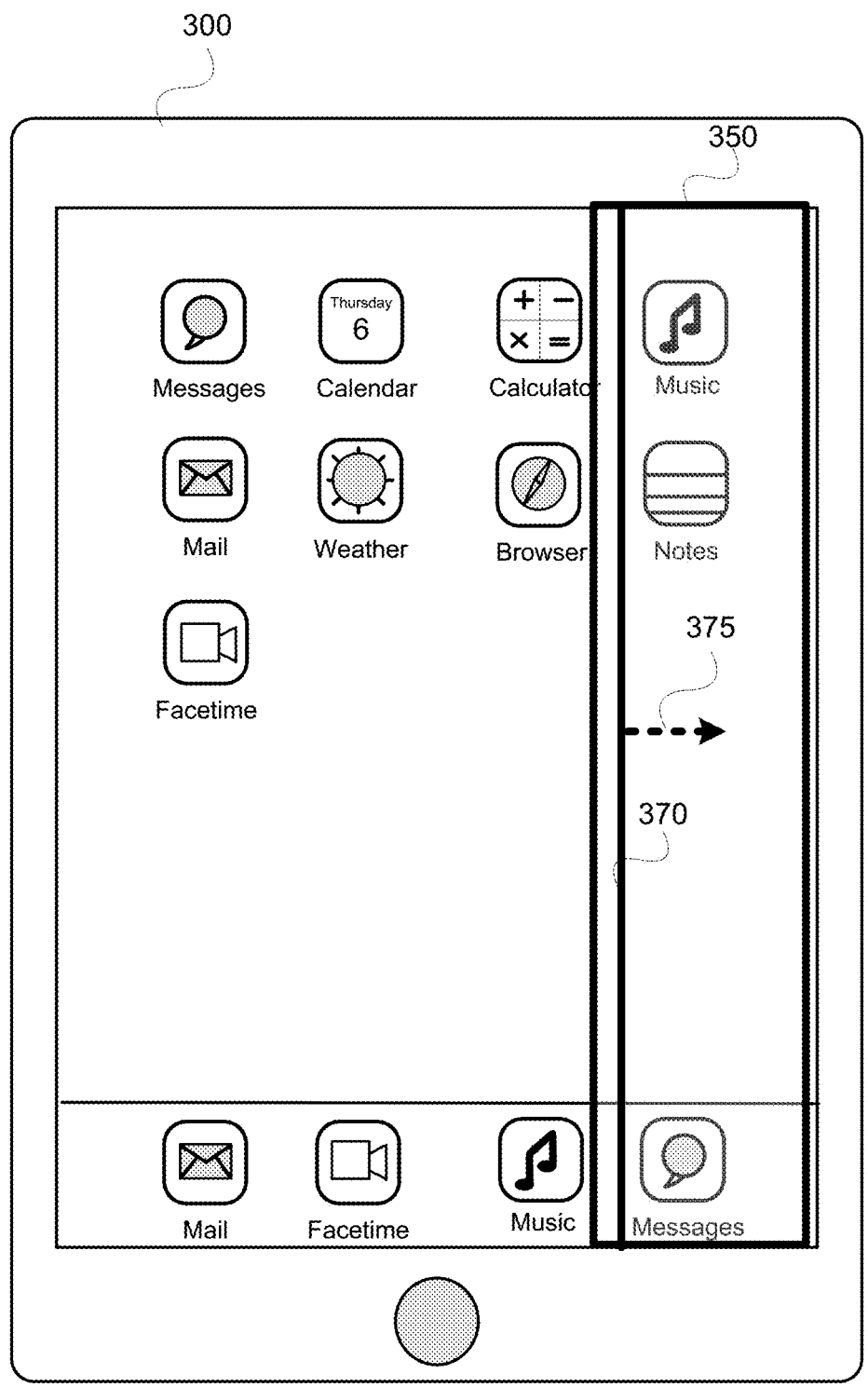

FIG. 3C includes user interfaces illustrating rectangular moving visually distinguished regions for location (e.g., position, point, or region) selection, for use with assistive scanning software, according to some embodiments.

Figure 3D:
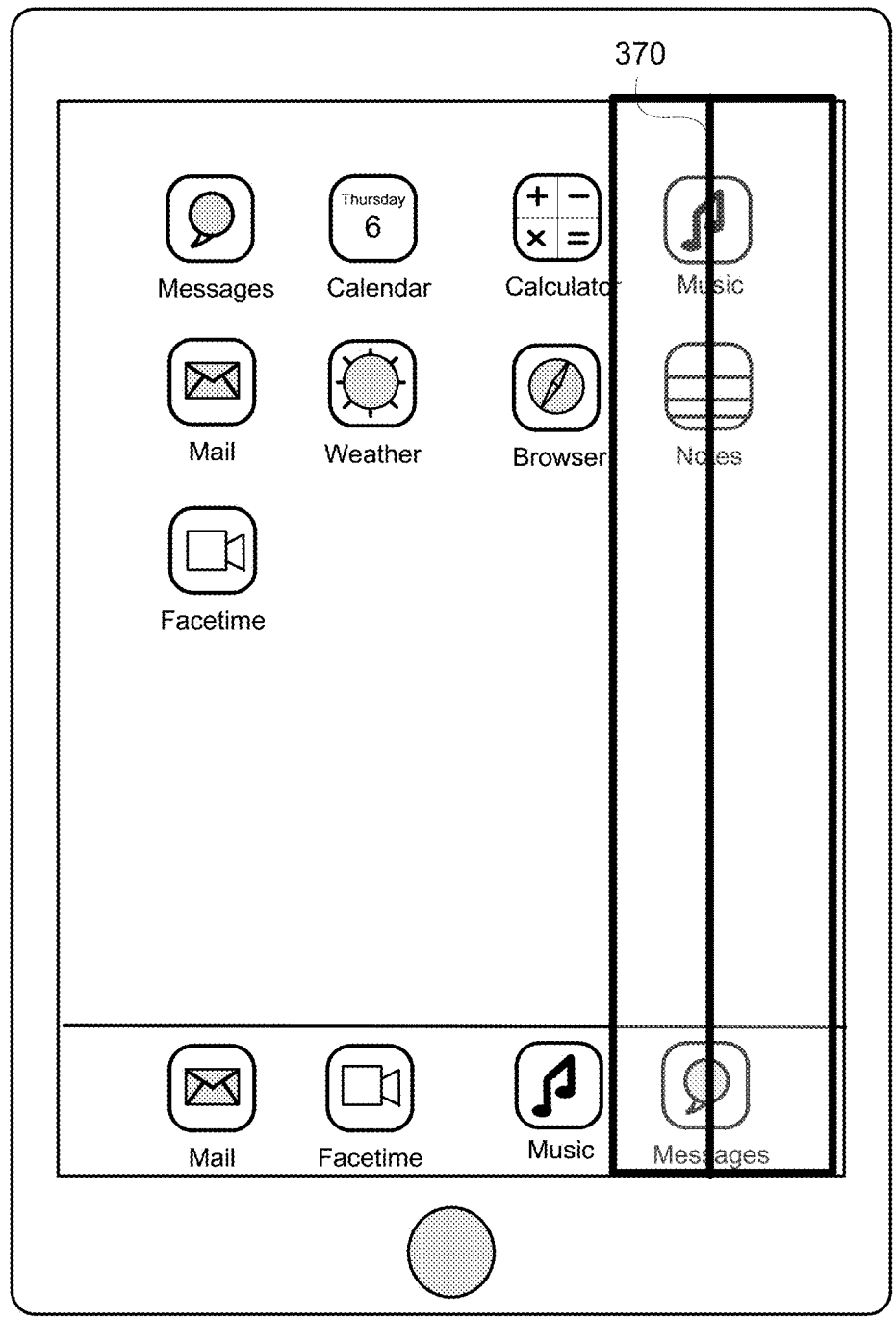

FIG. 3D includes user interfaces illustrating rectangular moving visually distinguished regions for location (e.g., position, point, or region) selection, for use with assistive scanning software, according to some embodiments.

Figure 3E:
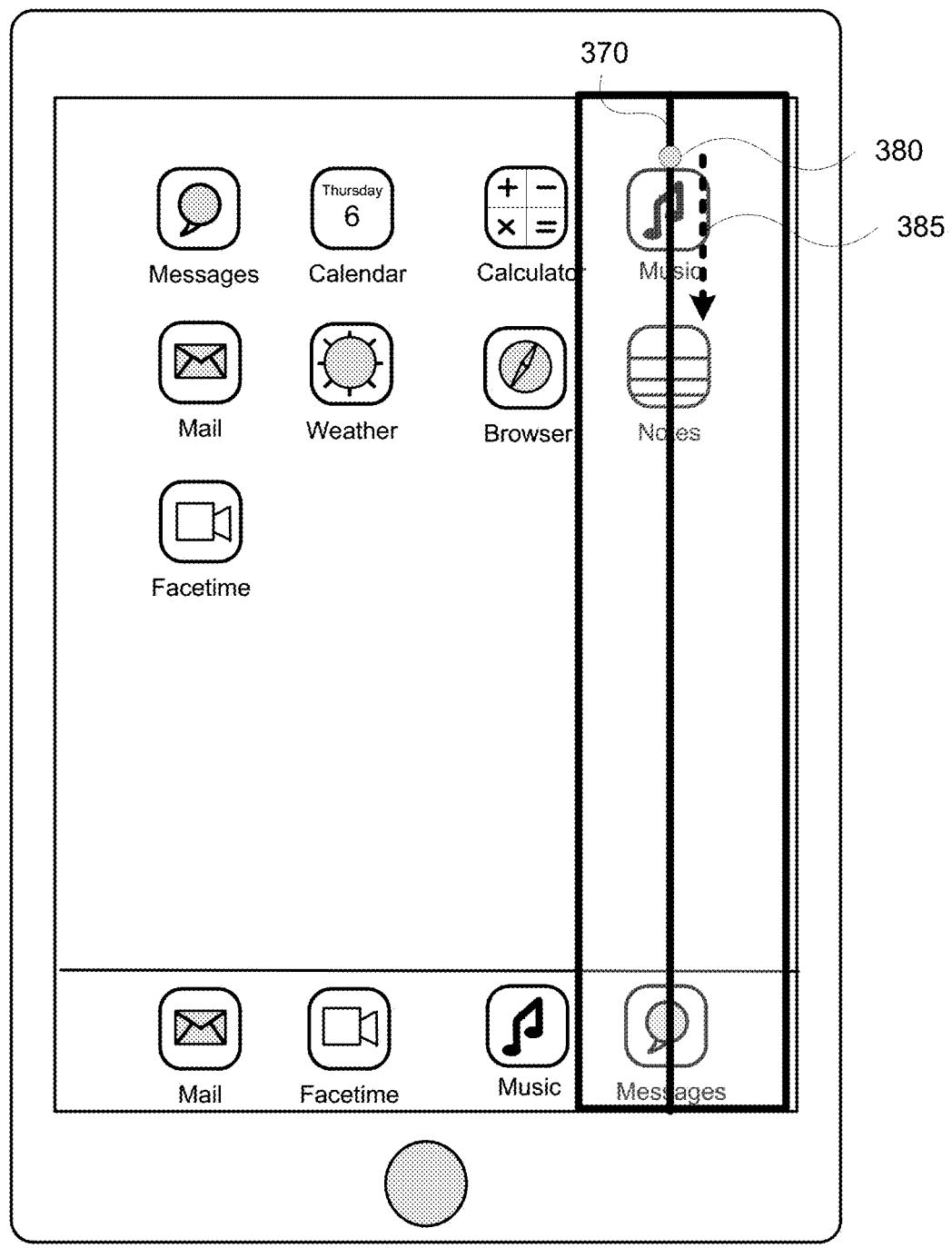

FIG. 3E includes user interfaces illustrating rectangular moving visually distinguished regions for location (e.g., position, point, or region) selection, for use with assistive scanning software, according to some embodiments.

Figure 3F:
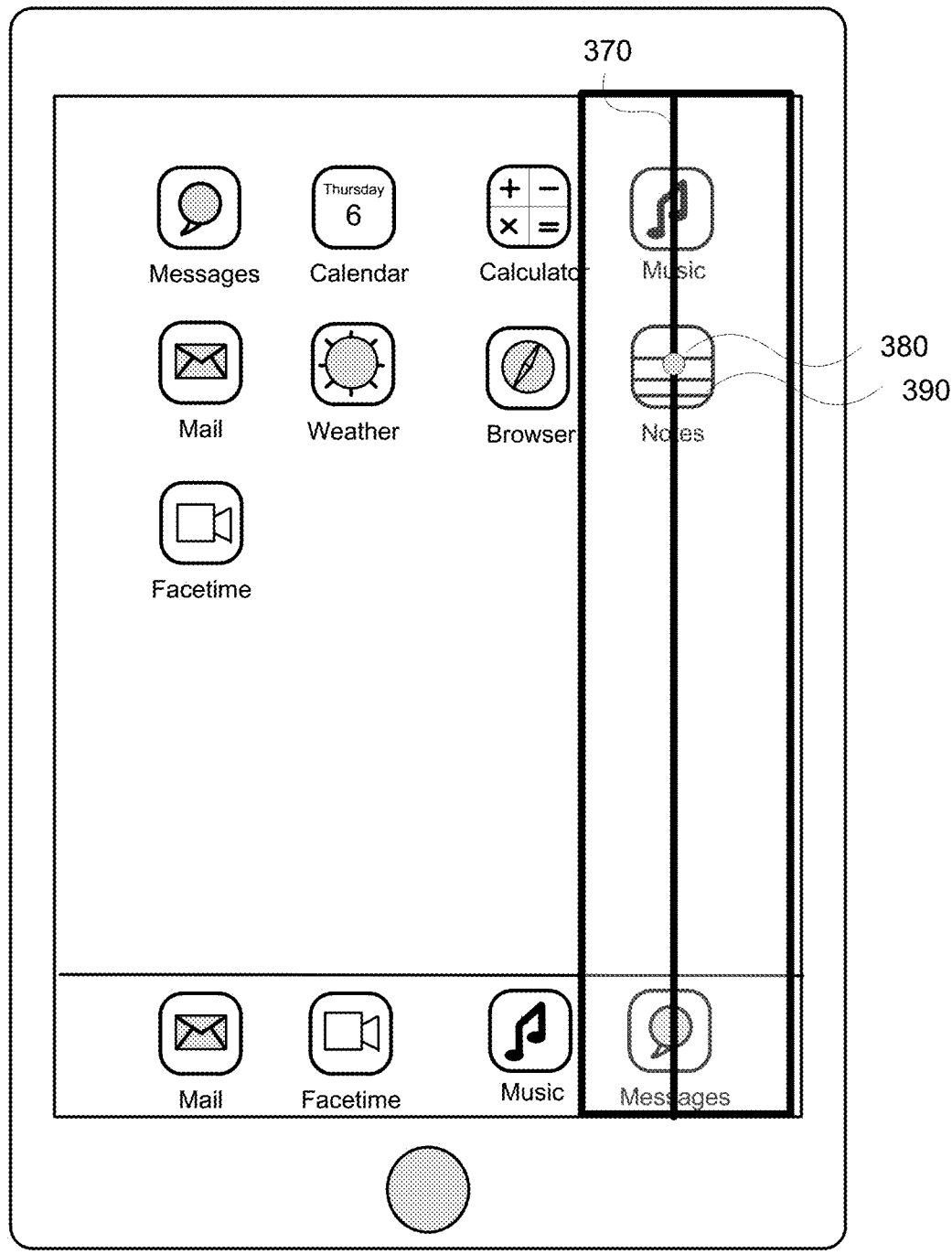

FIG. 3F includes user interfaces illustrating rectangular moving visually distinguished regions for location (e.g., position, point, or region) selection, for use with assistive scanning software, according to some embodiments.

Figure 3G:
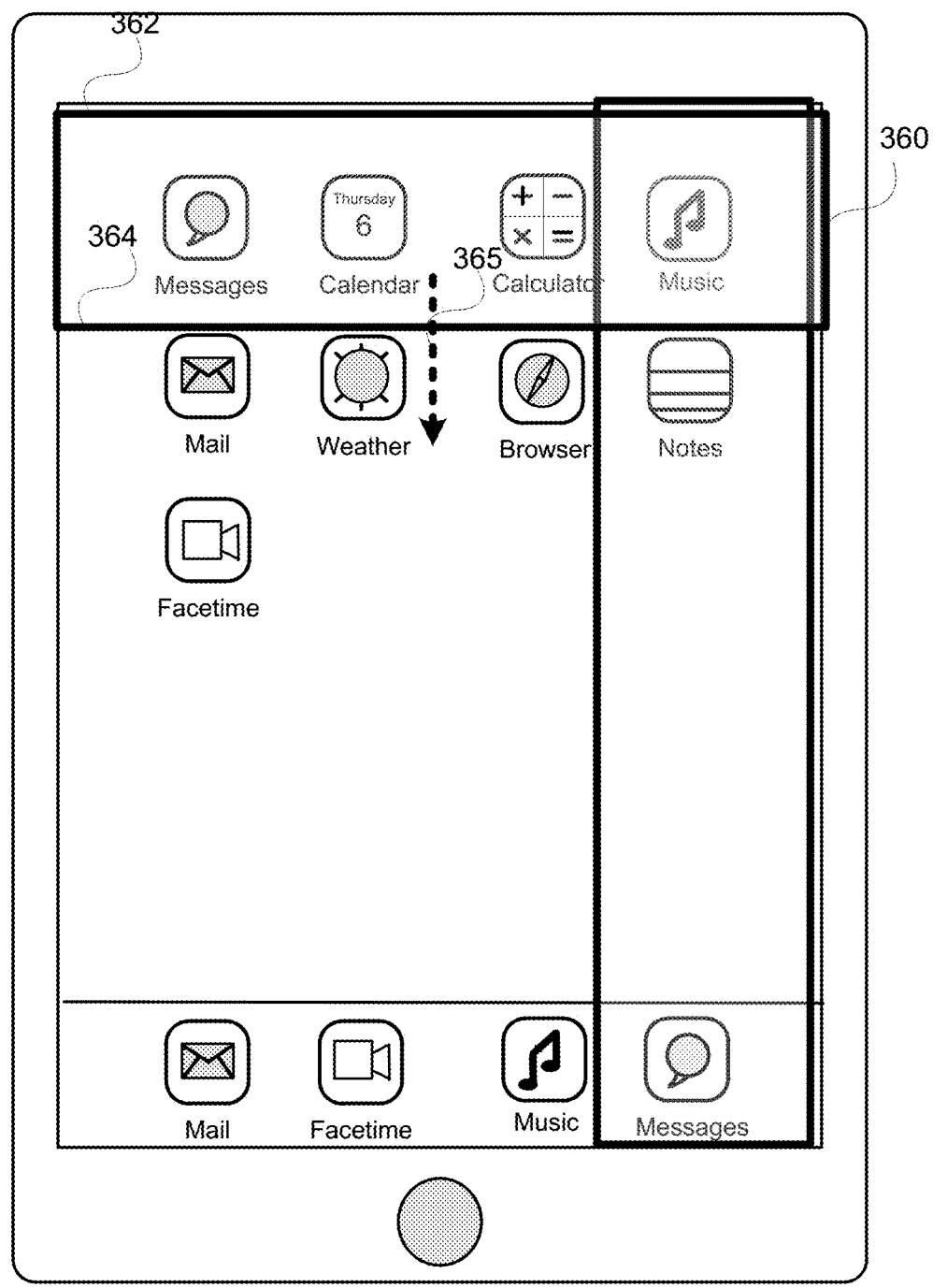

FIG. 3G includes user interfaces illustrating rectangular moving visually distinguished regions for location (e.g., position, point, or region) selection, for use with assistive scanning software, according to some embodiments.

Figure 3H:
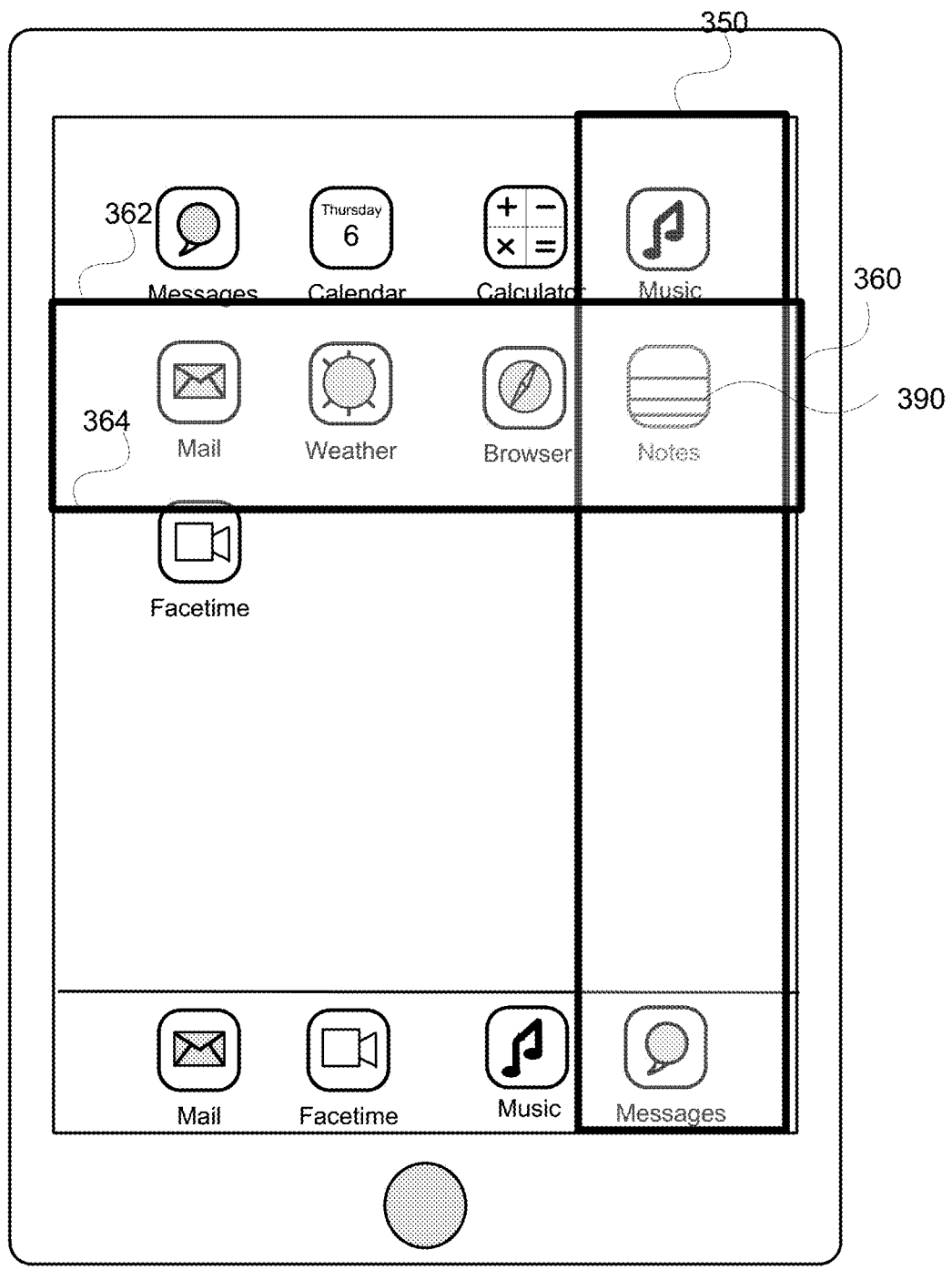

FIG. 3H includes user interfaces illustrating rectangular moving visually distinguished regions for location (e.g., position, point, or region) selection, for use with assistive scanning software, according to some embodiments.

Figure 3I:
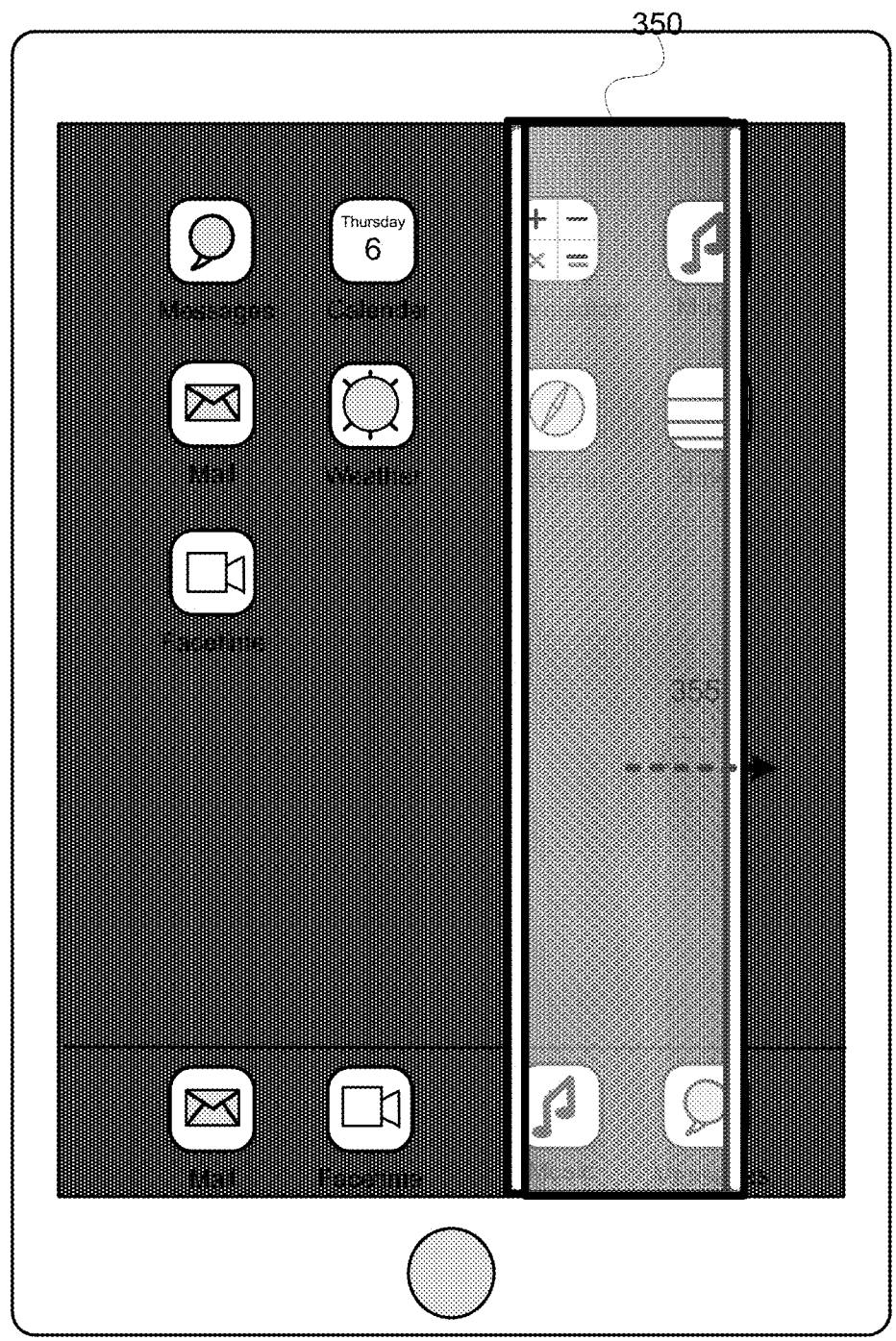

FIG. 3I includes user interfaces illustrating rectangular moving visually distinguished regions for location (e.g., position, point, or region) selection, for use with assistive scanning software, according to some embodiments.

Figure 3J:

FIG. 3J includes user interfaces illustrating rectangular moving visually distinguished regions for location (e.g., position, point, or region) selection, for use with assistive scanning software, according to some embodiments.

Figure 3K:
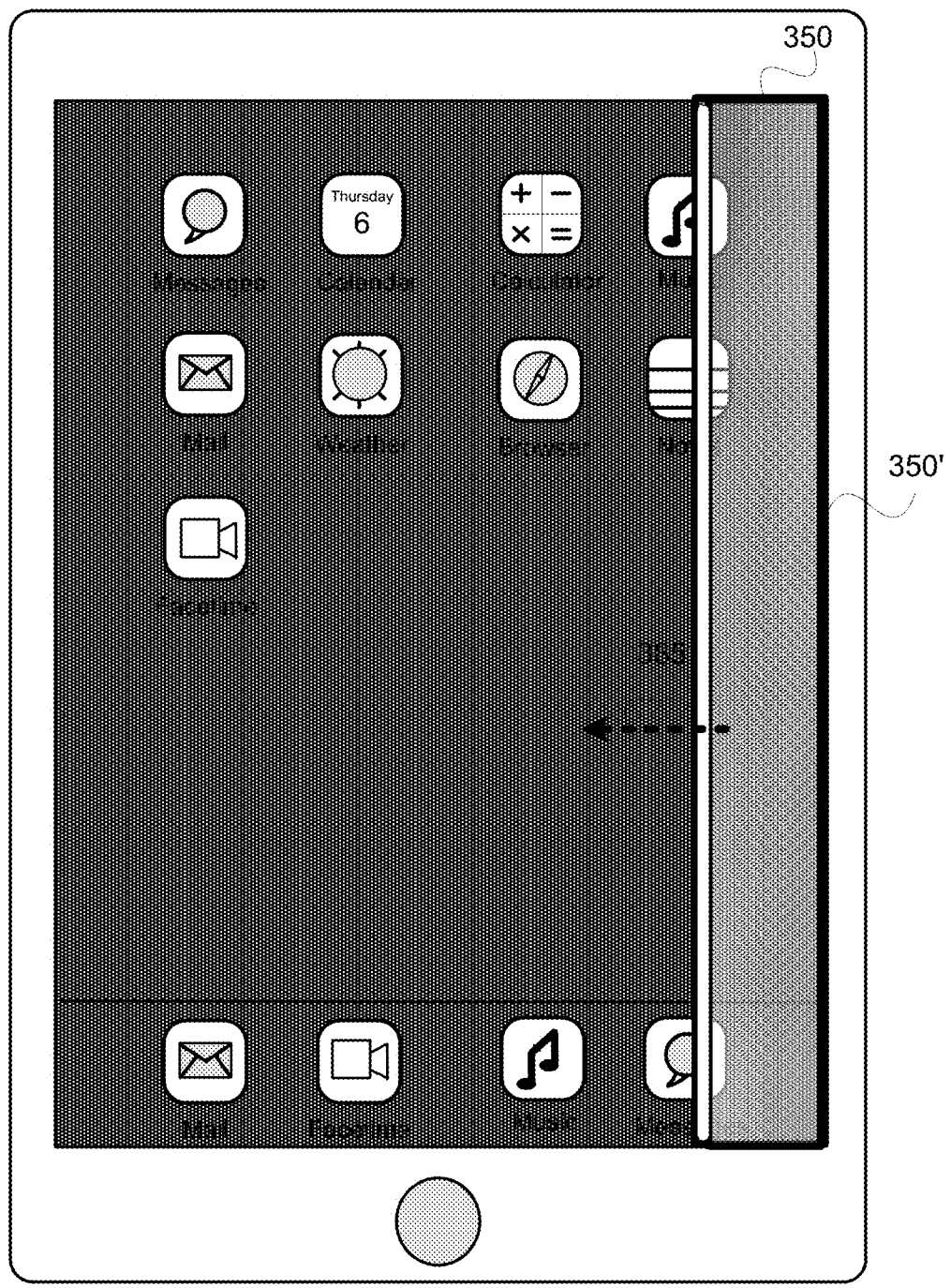

FIG. 3K includes user interfaces illustrating rectangular moving visually distinguished regions for location (e.g., position, point, or region) selection, for use with assistive scanning software, according to some embodiments.

Figure 4A:
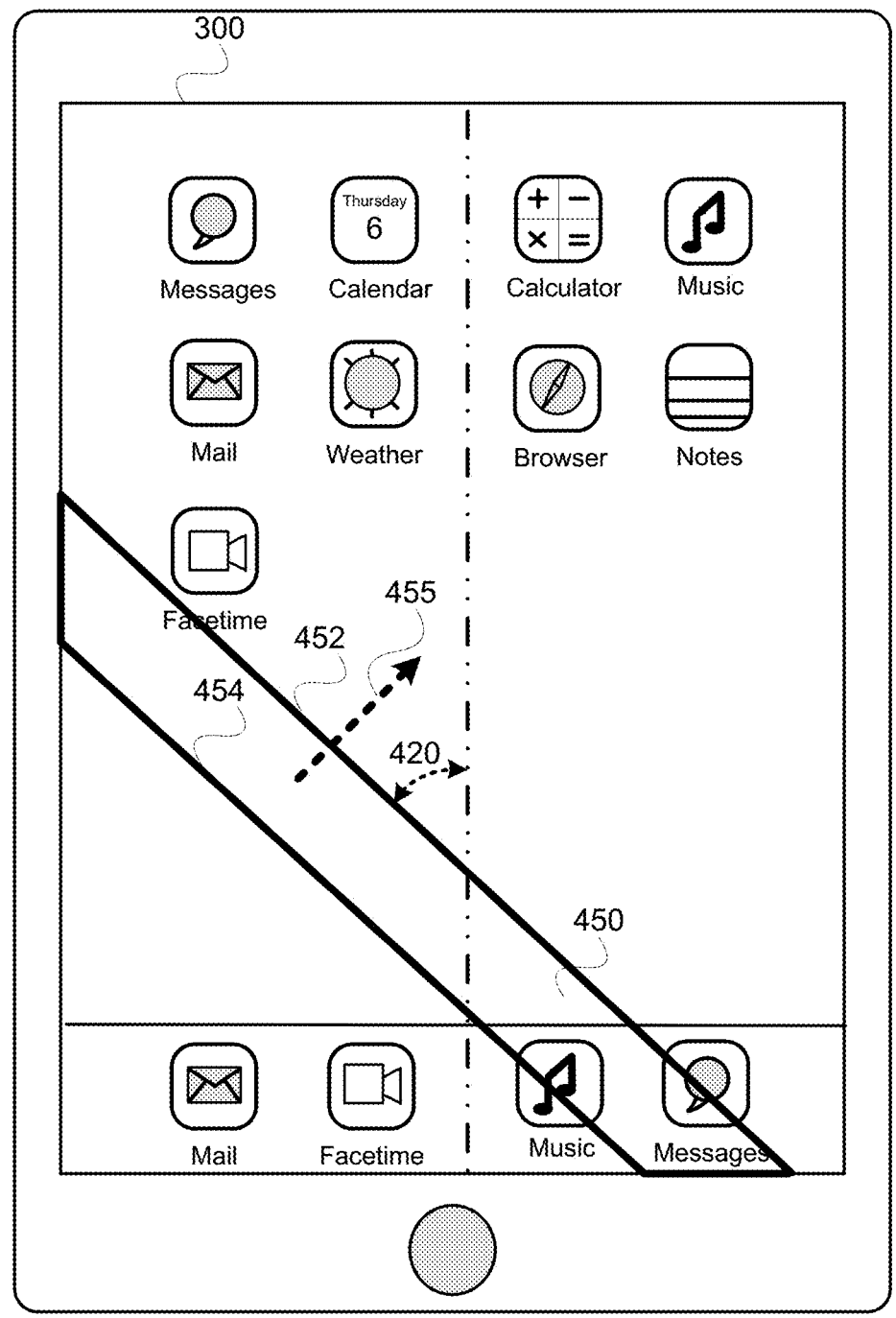

FIG. 4A includes user interfaces illustrating polygonal, inclined moving visually distinguished regions for location (e.g., position, point, or region) selection, for use with assistive scanning software, according to some embodiments.

Figure 4B:
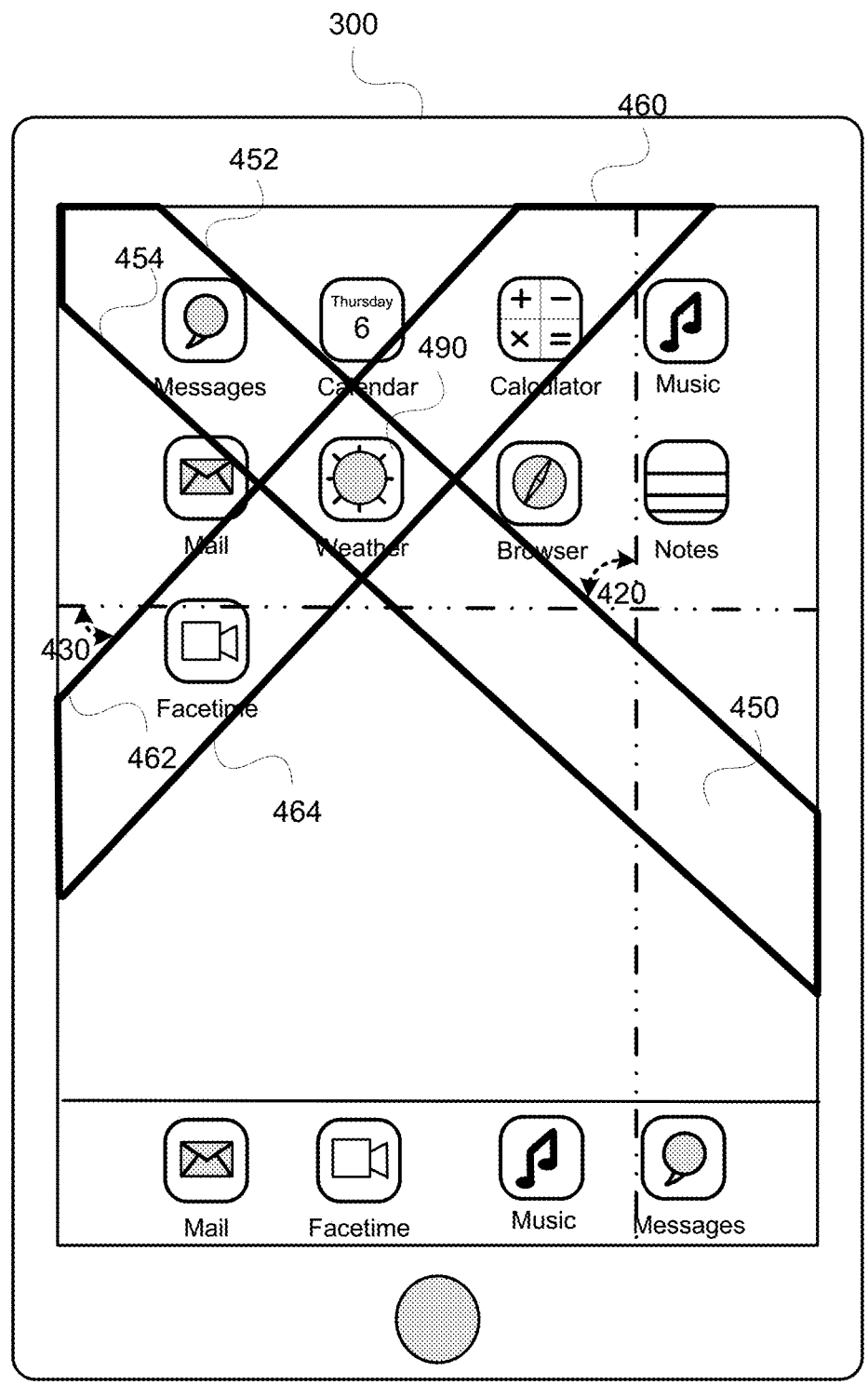

FIG. 4B includes user interfaces illustrating polygonal, inclined moving visually distinguished regions for location (e.g., position, point, or region) selection, for use with assistive scanning software, according to some embodiments.

Figure 5A:
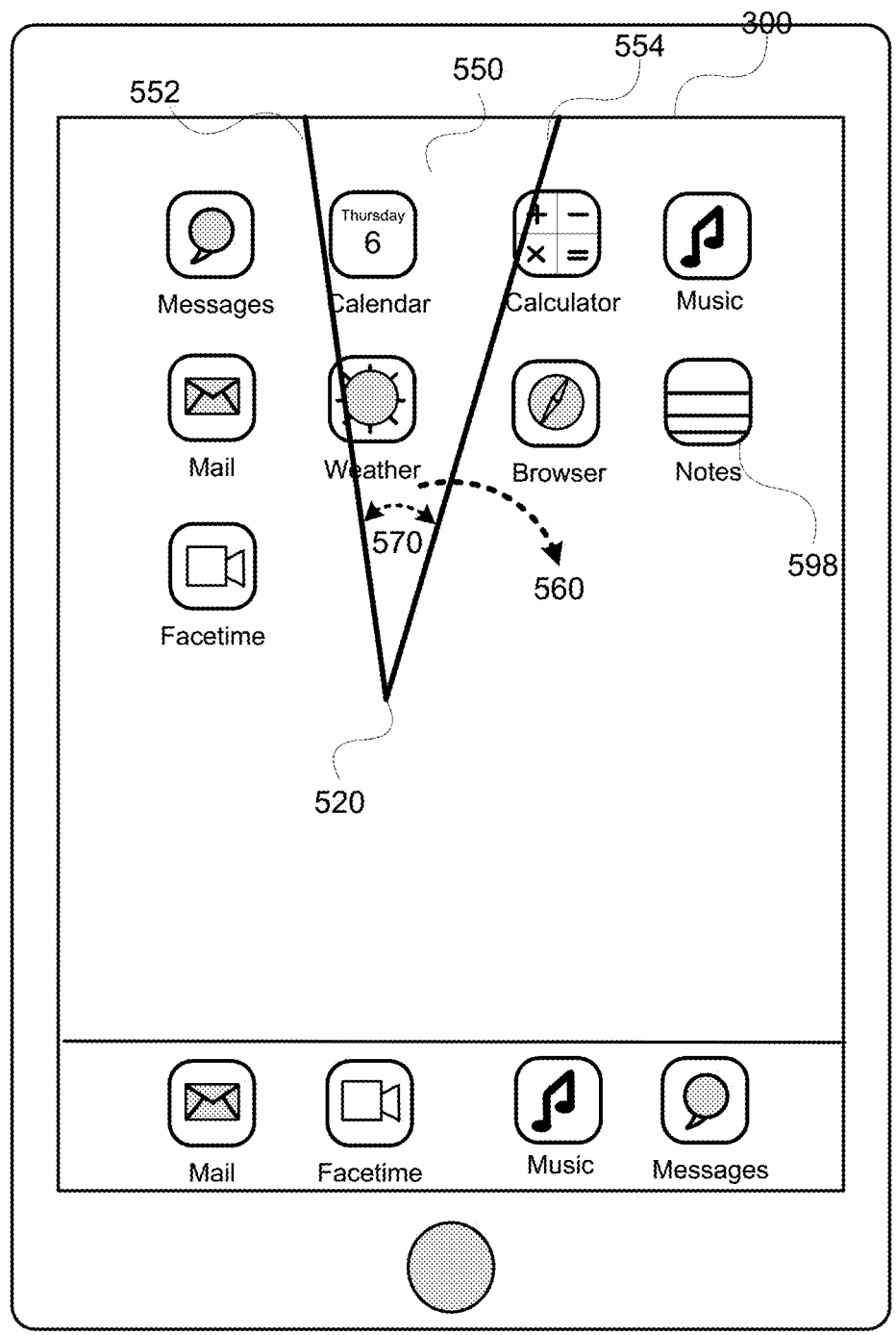

FIG. 5A includes user interfaces illustrating rotating angular wedges for location (e.g., position, point, or region) selection, for use with assistive scanning software, according to some embodiments.

Figure 5B:
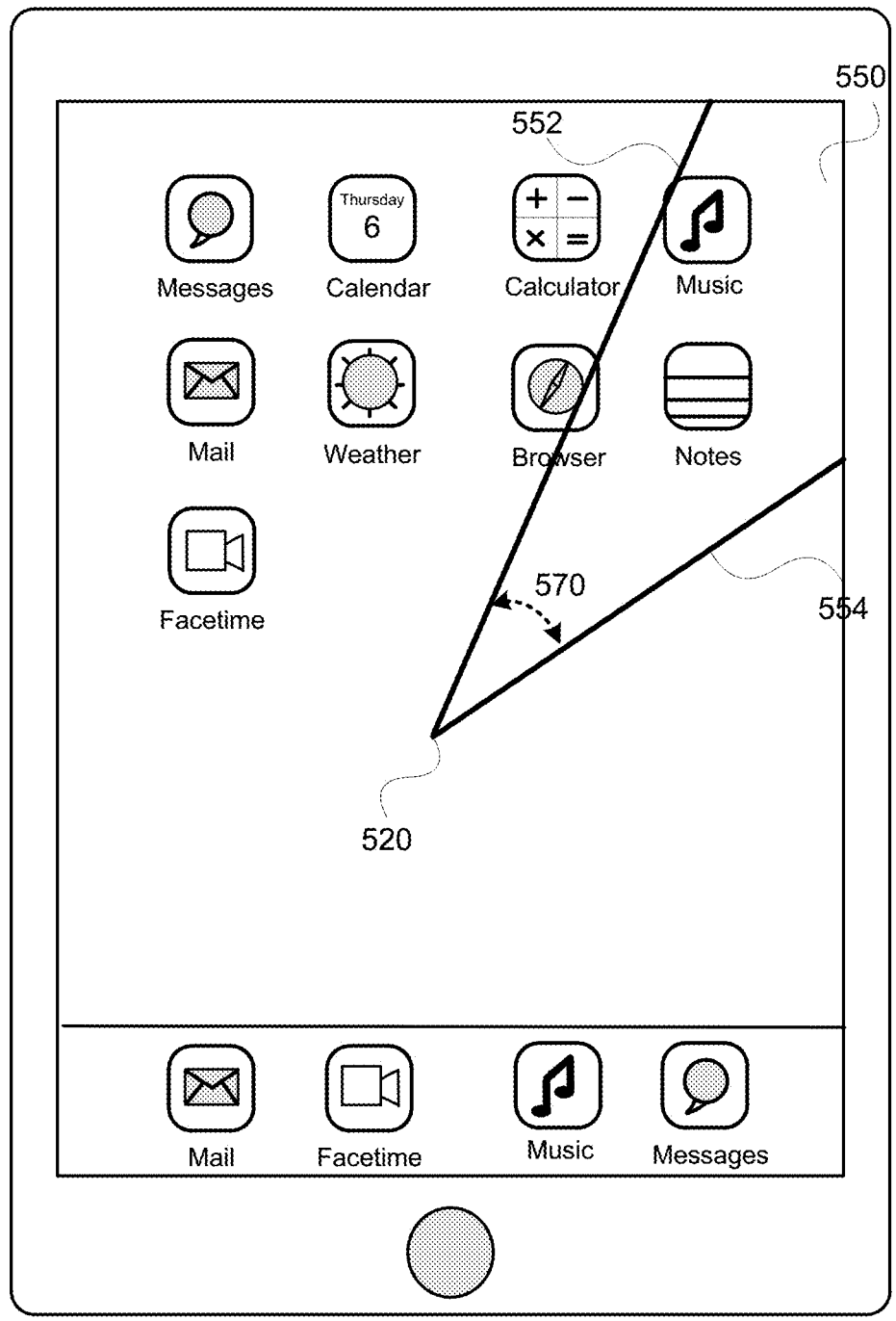

FIG. 5B includes user interfaces illustrating rotating angular wedges for location (e.g., position, point, or region) selection, for use with assistive scanning software, according to some embodiments.

Figure 5C:
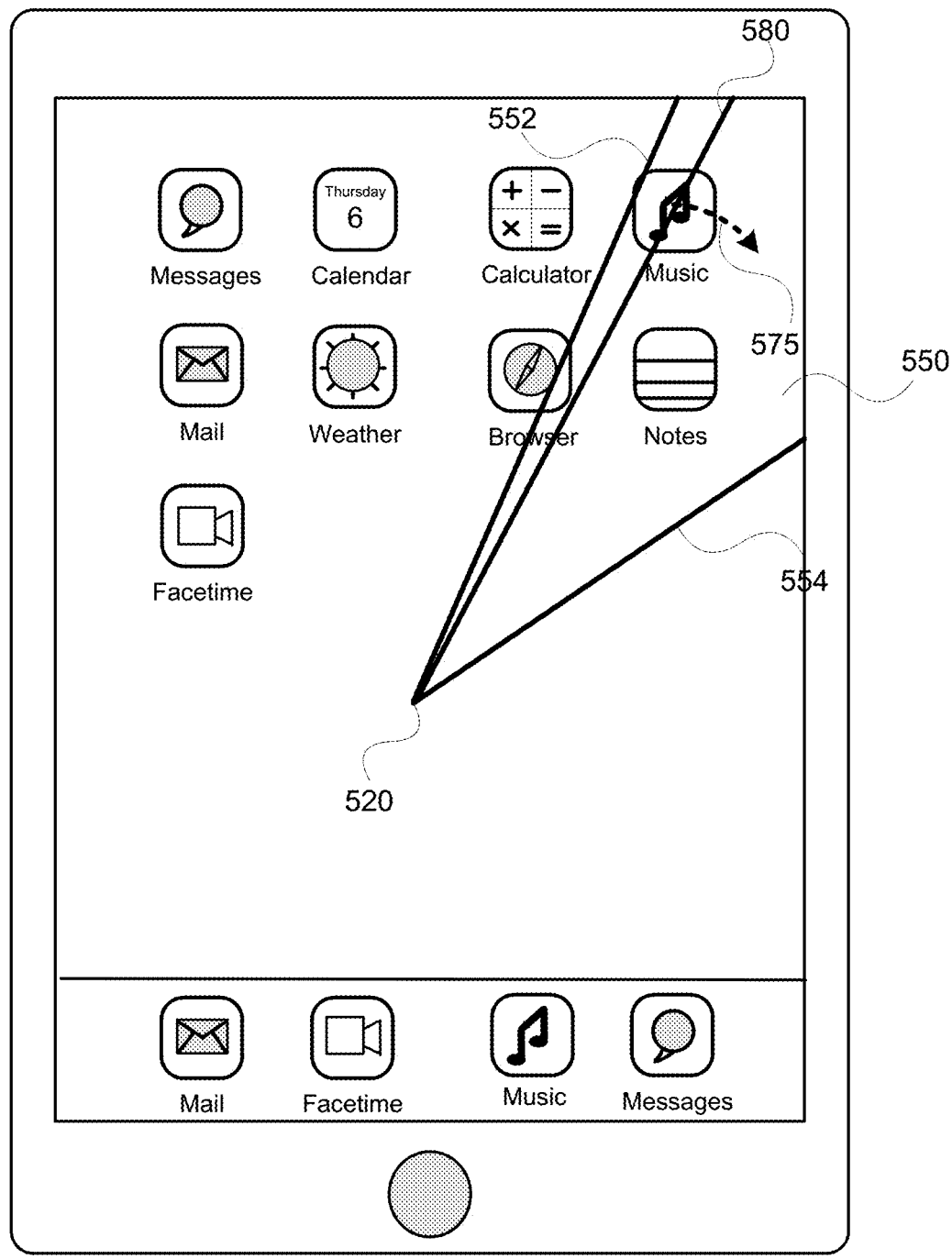

FIG. 5C includes user interfaces illustrating rotating angular wedges for location (e.g., position, point, or region) selection, for use with assistive scanning software, according to some embodiments.

Figure 5D:
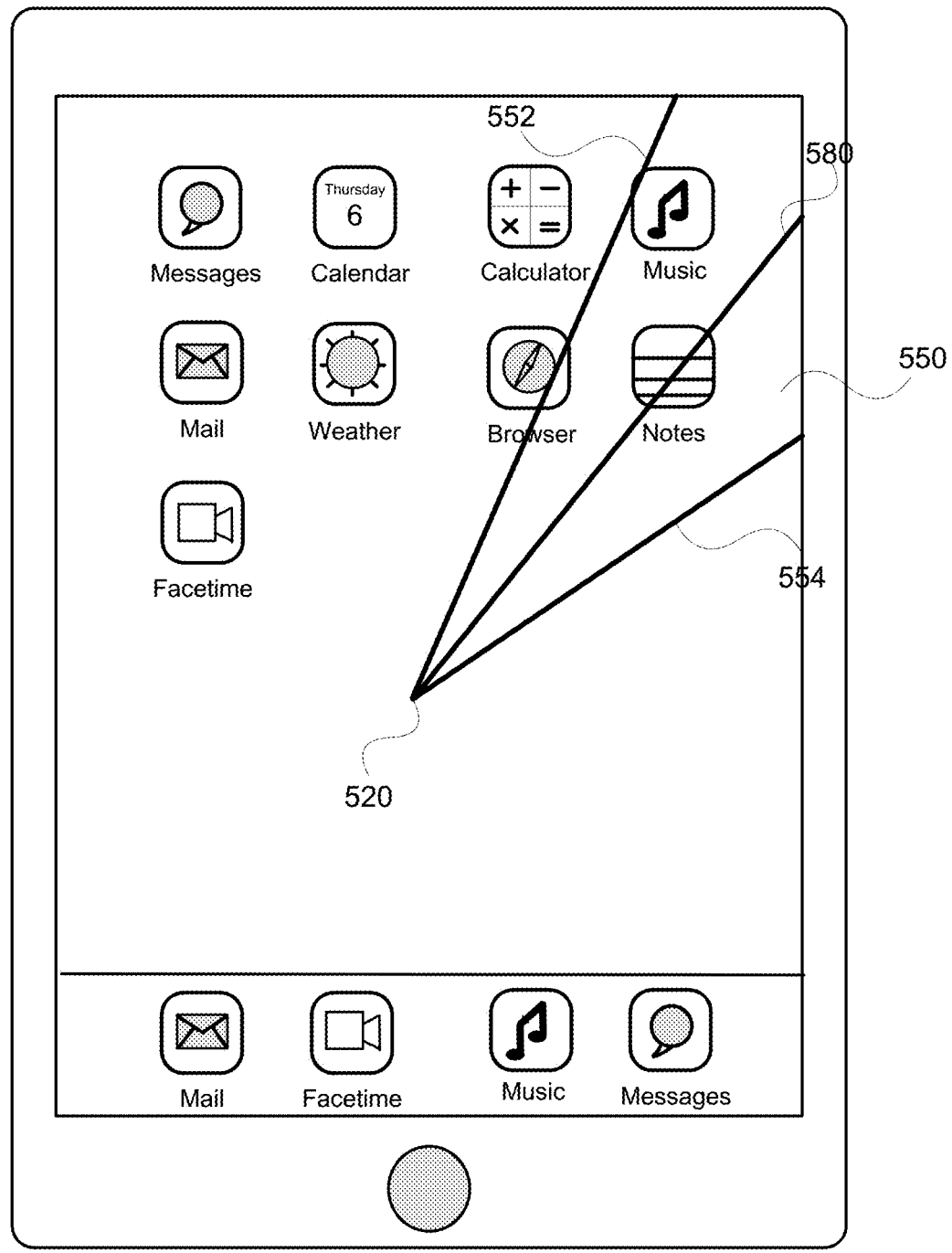

FIG. 5D includes user interfaces illustrating rotating angular wedges for location (e.g., position, point, or region) selection, for use with assistive scanning software, according to some embodiments.

Figure 5E:
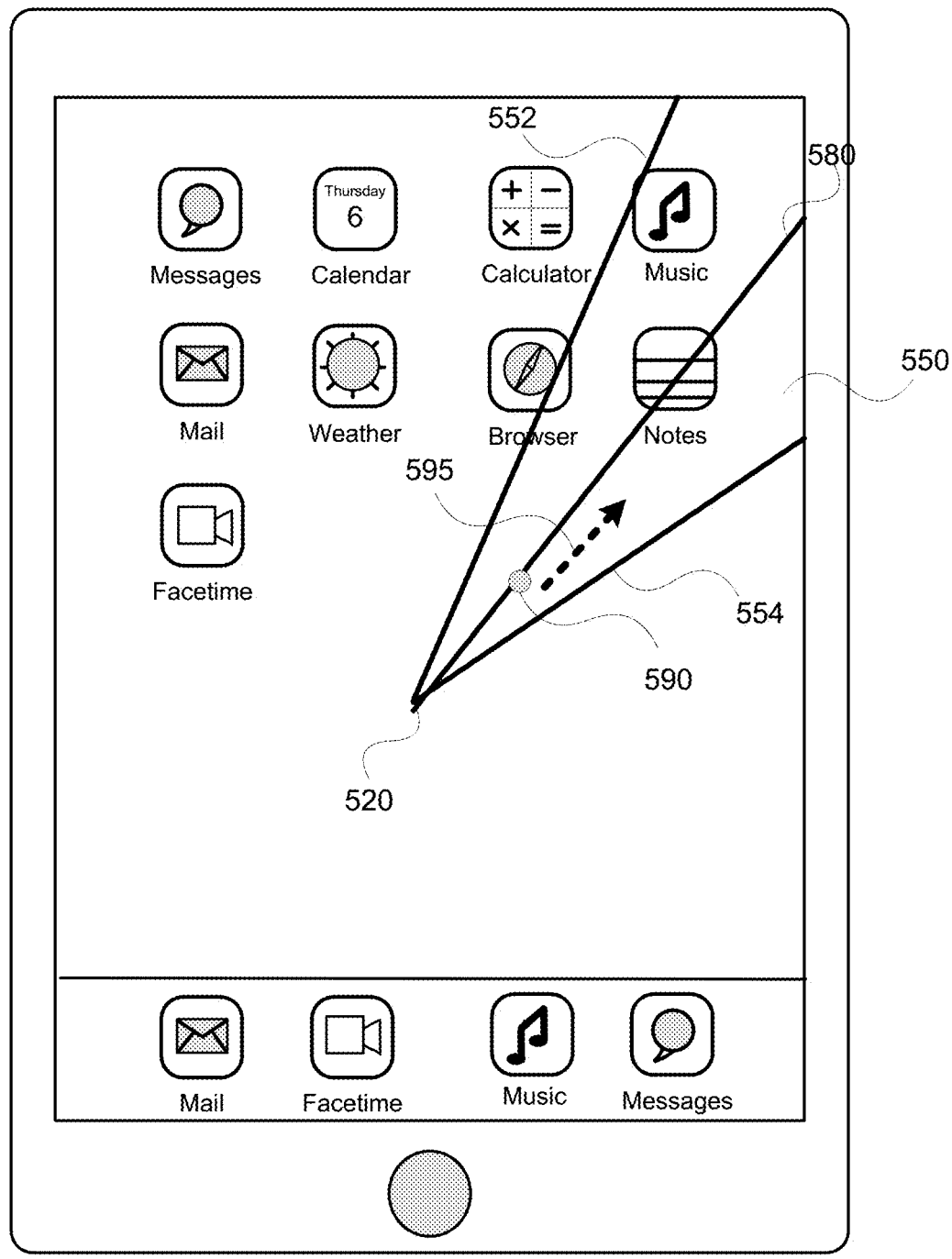

FIG. 5E includes user interfaces illustrating rotating angular wedges for location (e.g., position, point, or region) selection, for use with assistive scanning software, according to some embodiments.

Figure 5F:
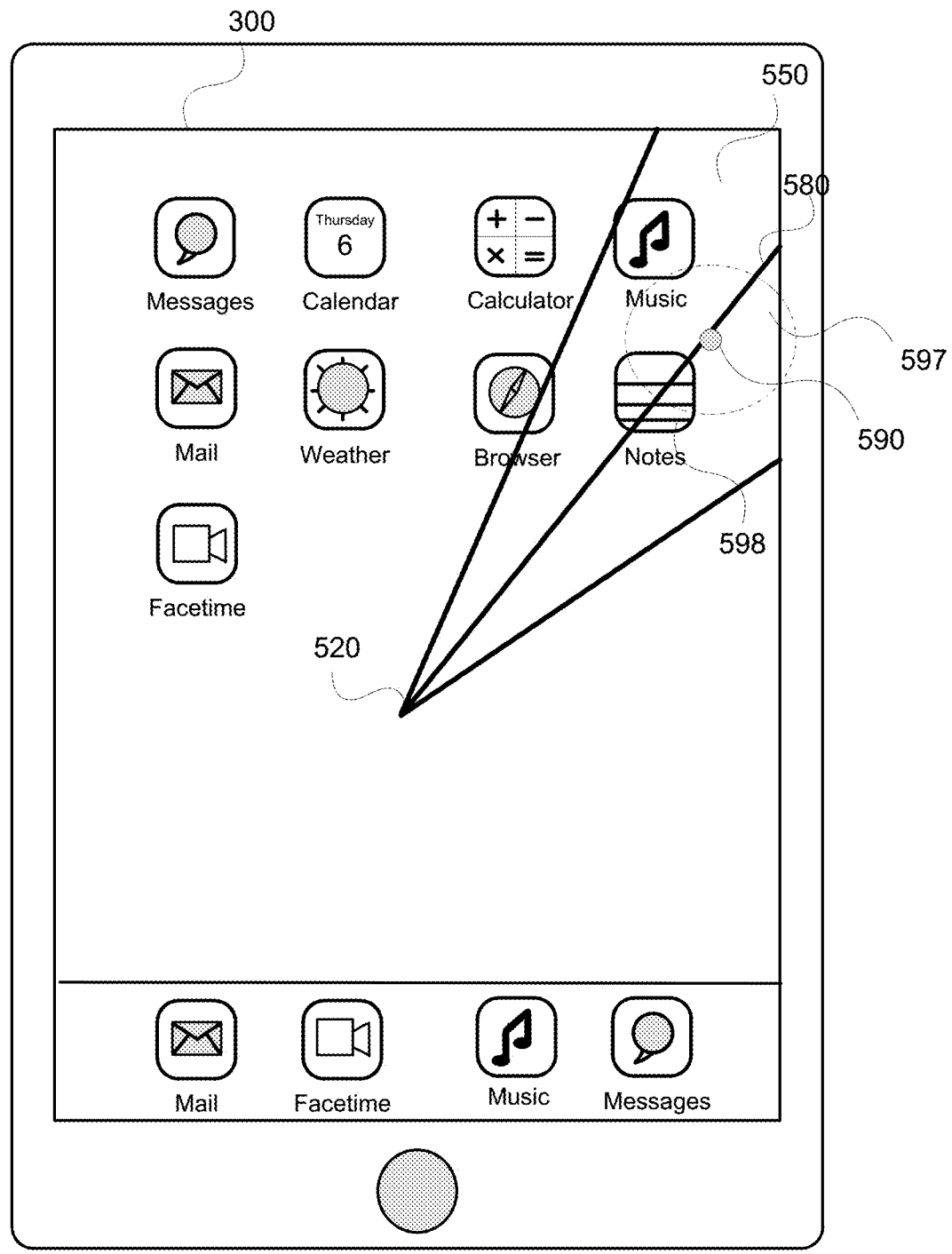

FIG. 5F includes user interfaces illustrating rotating angular wedges for location (e.g., position, point, or region) selection, for use with assistive scanning software, according to some embodiments.

Figure 6A:
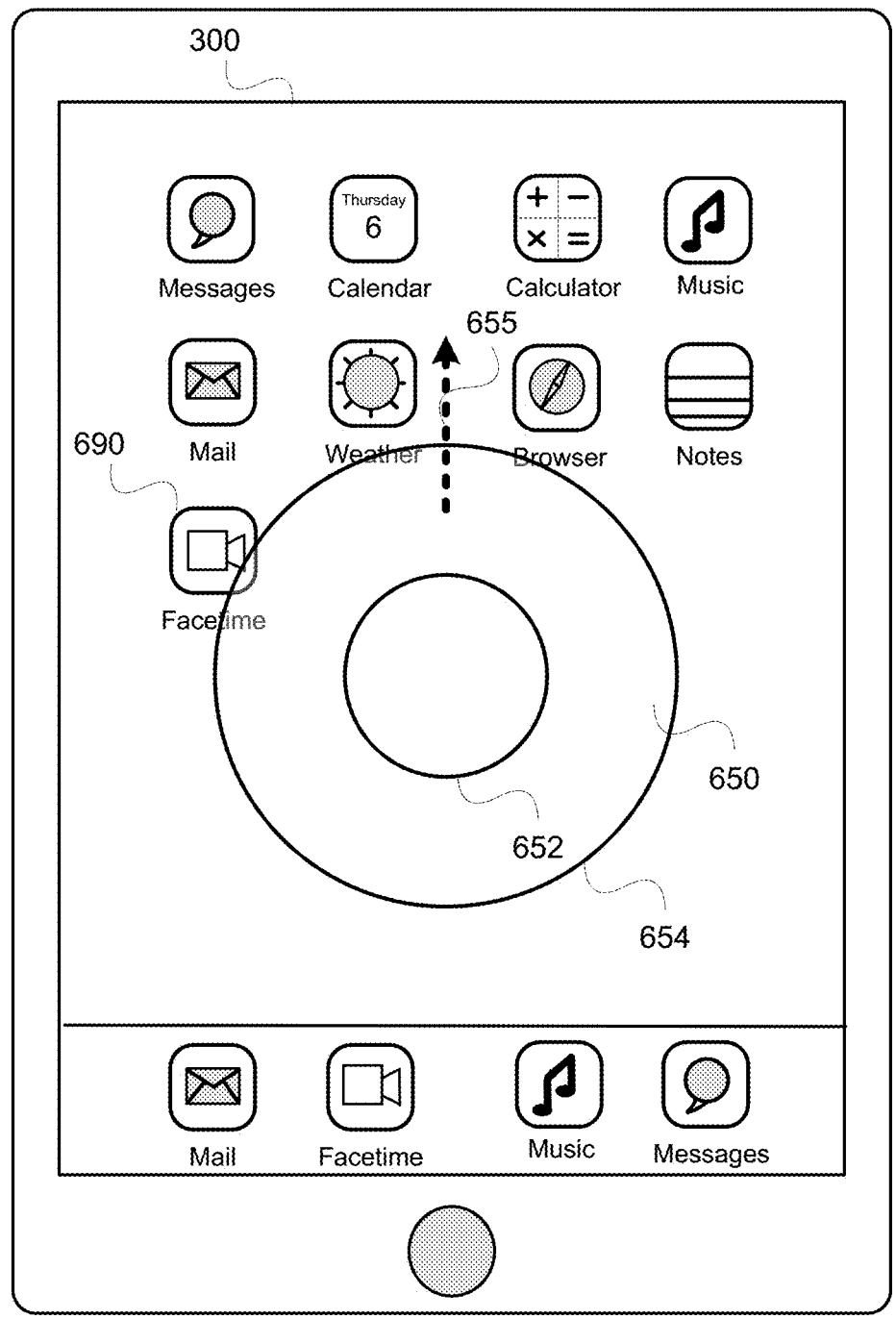

FIG. 6A includes user interfaces illustrating radially moving annular regions for location (e.g., position, point, or region) selection, for use with assistive scanning software, according to some embodiments.

Figure 6B:
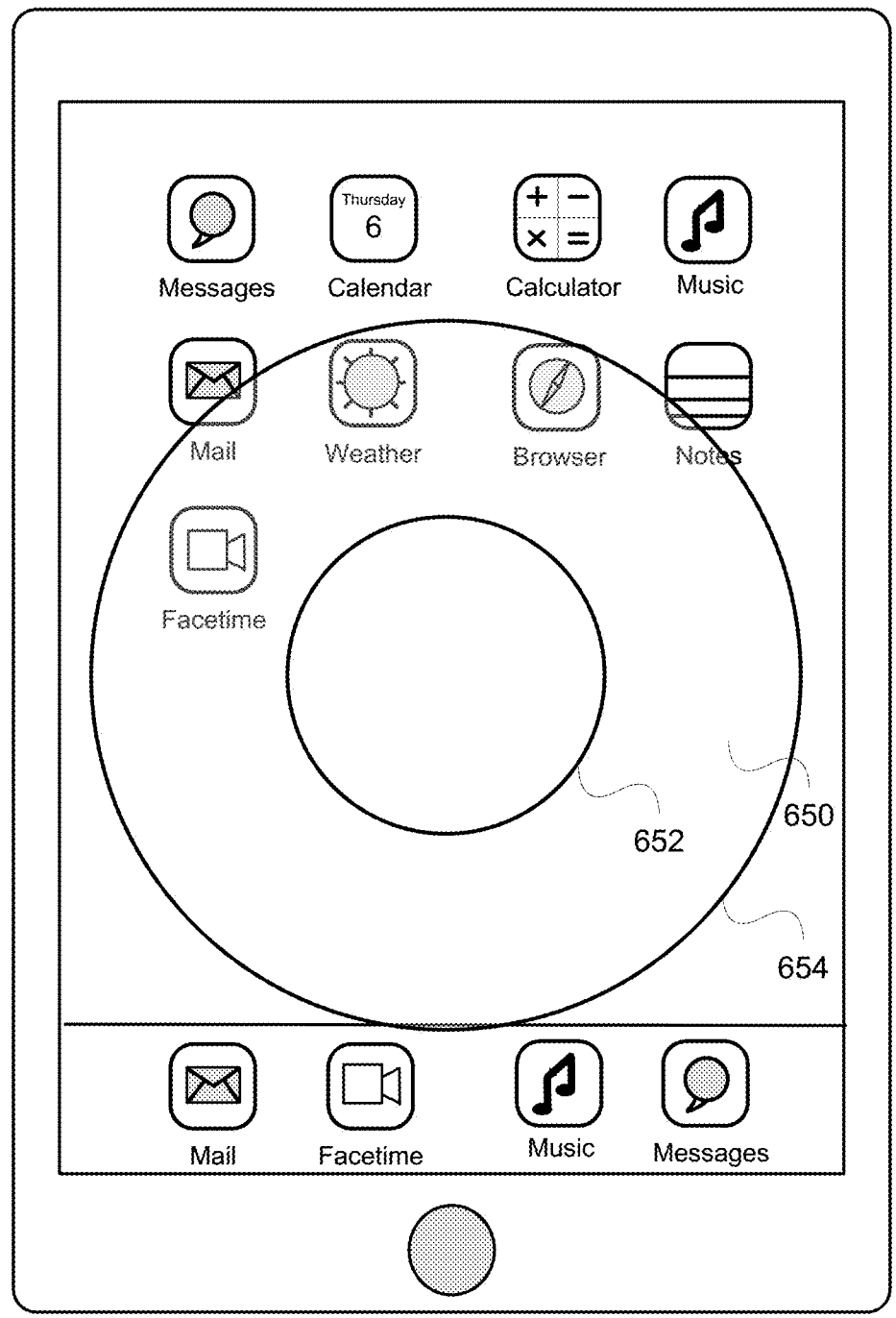

FIG. 6B includes user interfaces illustrating radially moving annular regions for location (e.g., position, point, or region) selection, for use with assistive scanning software, according to some embodiments.

Figure 6C:
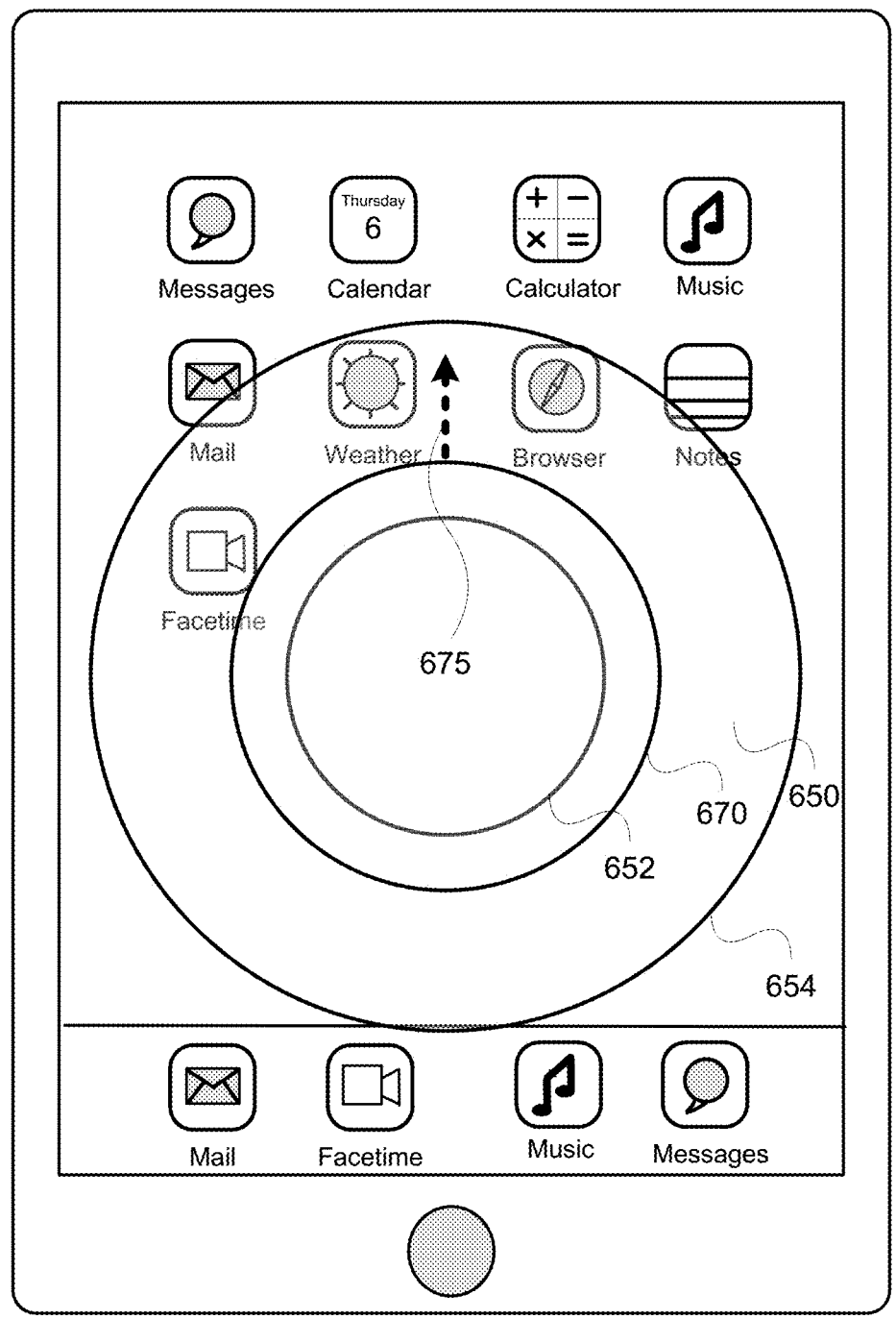

FIG. 6C includes user interfaces illustrating radially moving annular regions for location (e.g., position, point, or region) selection, for use with assistive scanning software, according to some embodiments.

Figure 6D:
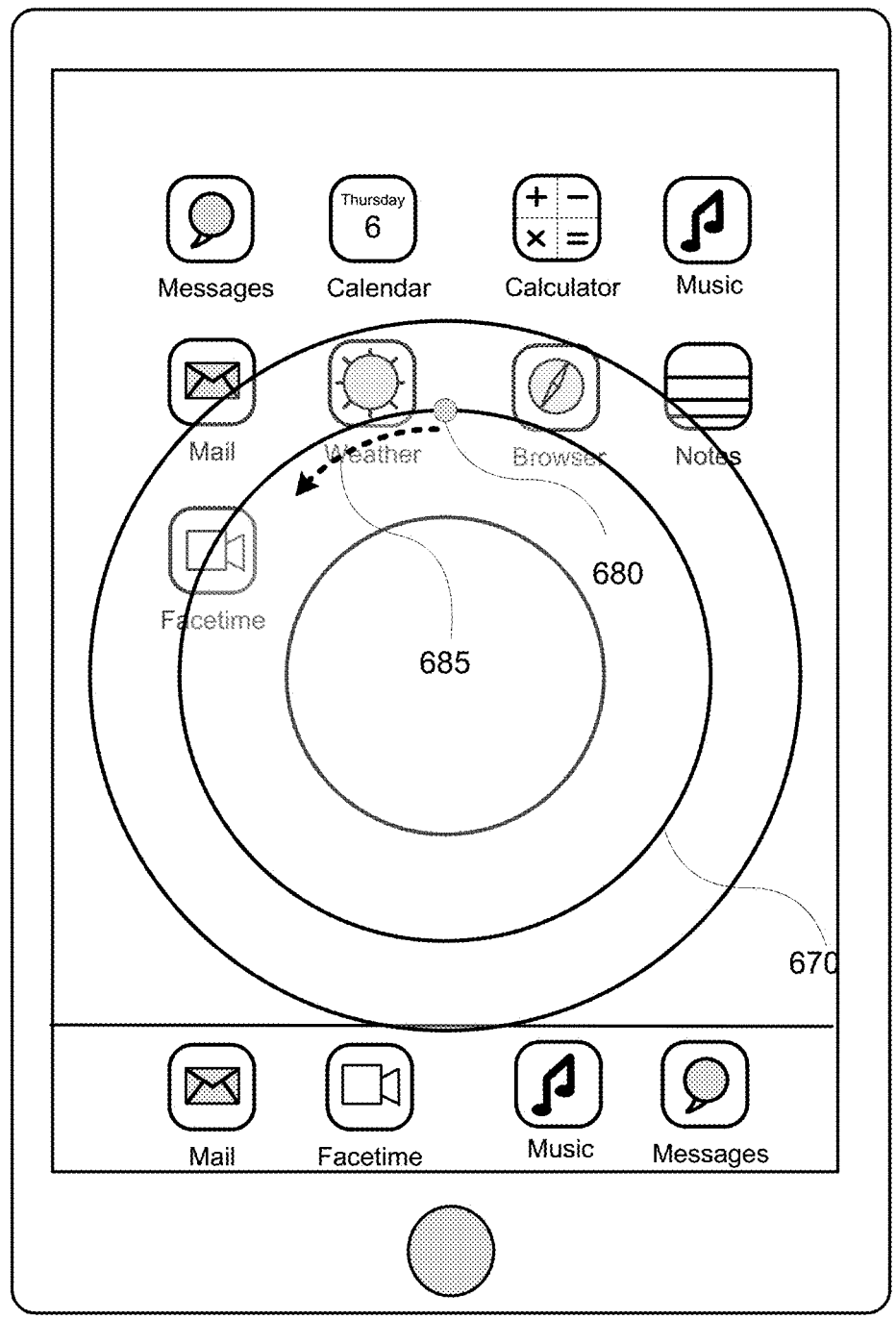

FIG. 6D includes user interfaces illustrating radially moving annular regions for location (e.g., position, point, or region) selection, for use with assistive scanning software, according to some embodiments.

Figure 6E:
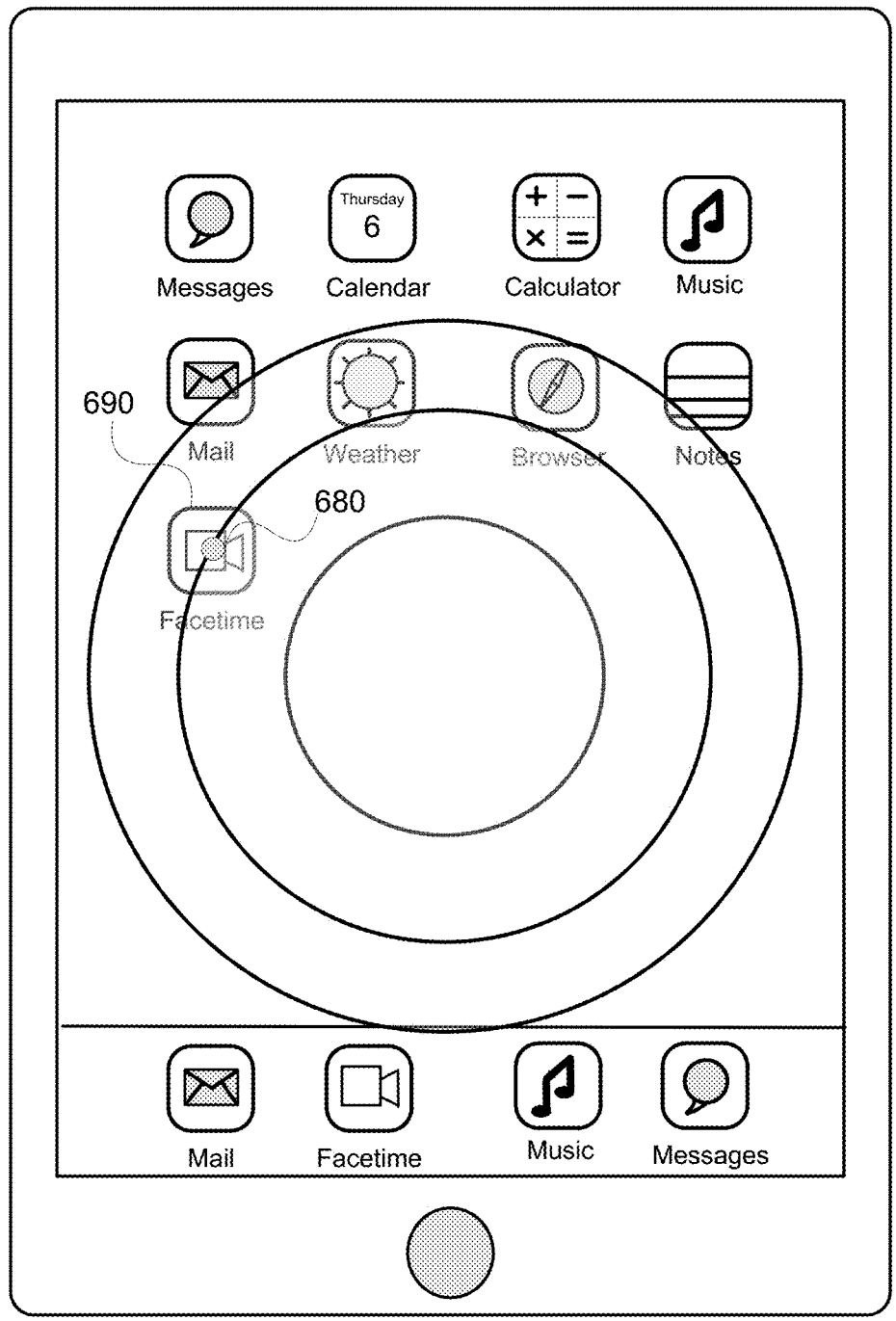

FIG. 6E includes user interfaces illustrating radially moving annular regions for location (e.g., position, point, or region) selection, for use with assistive scanning software, according to some embodiments.

Figure 7:
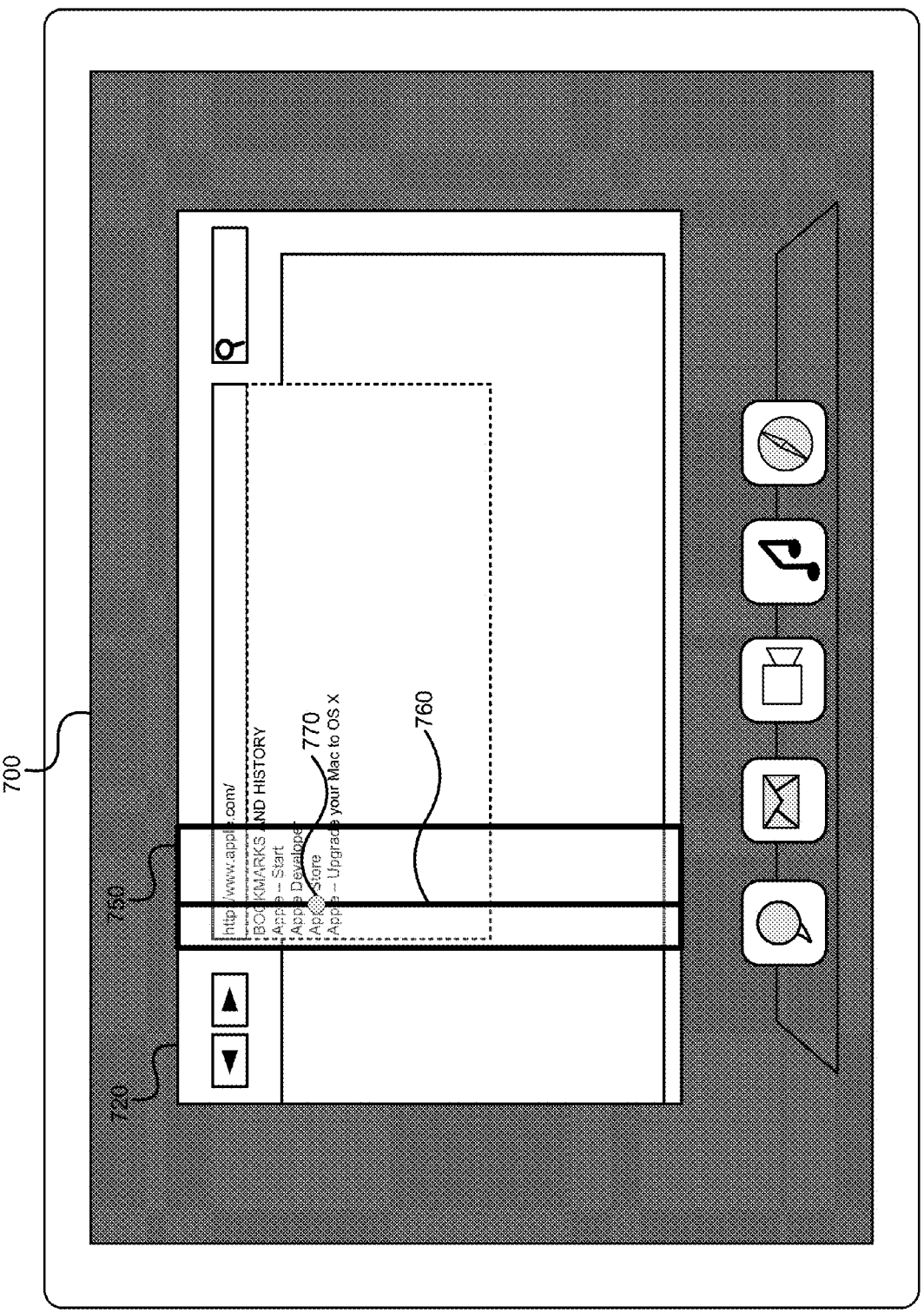

FIG. 7 includes a user interface illustrating movement of selection indicators within a portion of a user interface, according to some embodiments.

Figure 8:
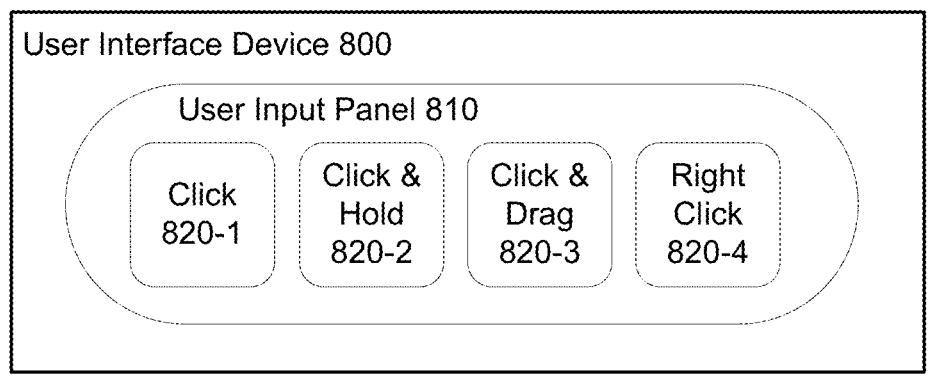

FIG. 8 includes a user interface device with a user selectable panel of keys for interacting with a user-selected location (e.g., position, point, or region) of a user interface, according to some embodiments.

The figures depict, and the detailed description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Computer Diagram

Figure 1A:
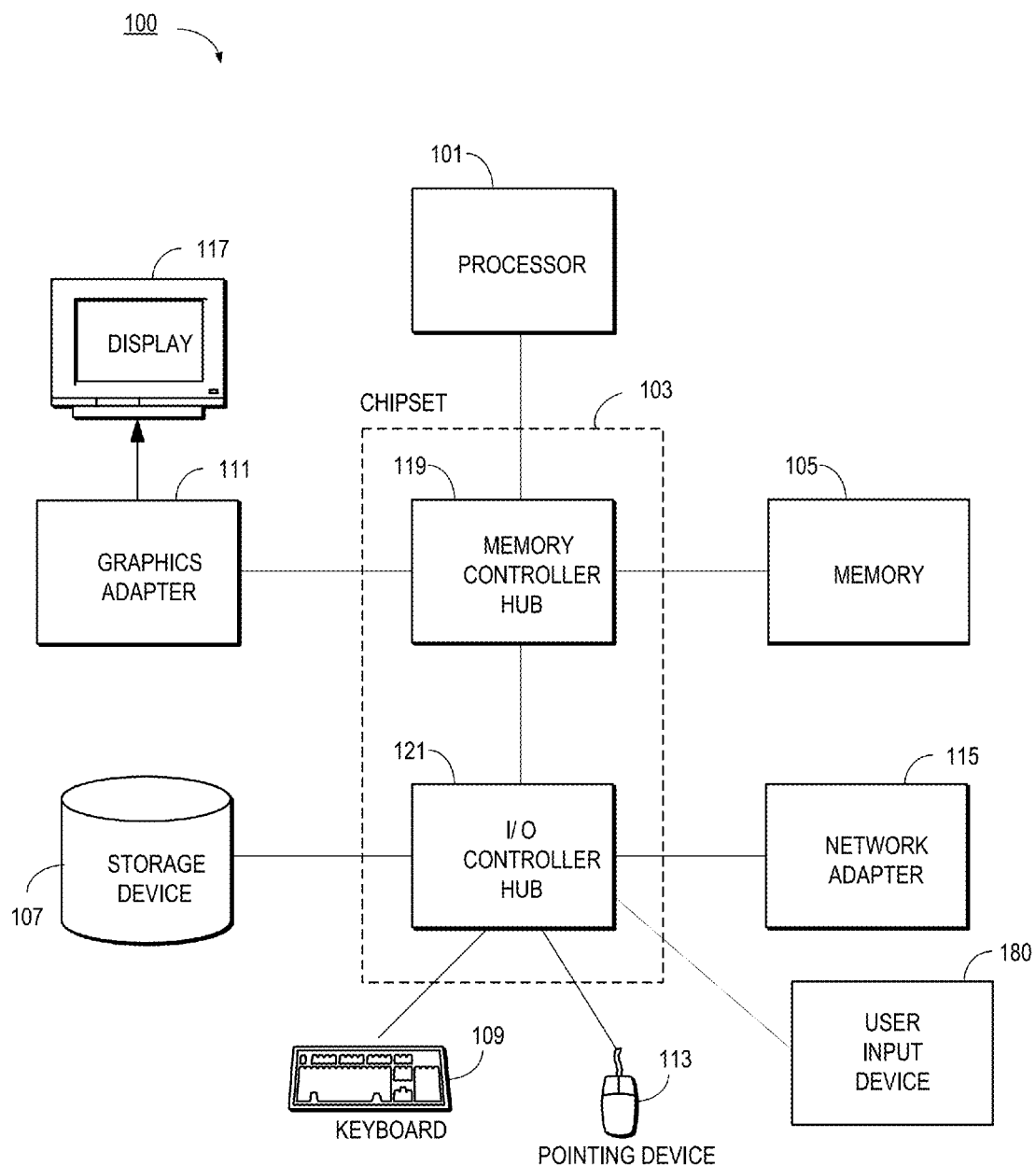
FIG. 1A illustrates a high-level block diagram illustrating a typical computer for acting as a computing device, according to some embodiments.

FIG. 1A is a high-level block diagram of a computer 100 for example, for acting as a computing device according to some embodiments. Illustrated are at least one processor 101 coupled to a chipset 103. Also coupled to the chipset 103 are memory 105, a storage device 107, a keyboard 109, a graphics adapter 111, a pointing device 113, and a network adapter 115. A display 117 is coupled to the graphics adapter 111. In one embodiment, the functionality of the chipset 103 is provided by a memory controller hub 119 and an I/O controller hub 121. In another embodiment, memory 105 is coupled directly to the processor 101 instead of the chipset 103.

The storage device 107 is any non-transitory computer-readable storage medium, such as a hard drive, compact disk read-only memory (CD-ROM), DVD, or a solid-state memory device. Memory 105 holds instructions and data used by the processor 101. The pointing device 113 may be a mouse, track ball, touch panel, or other type of pointing device, and is used in combination with the keyboard 109 to input data into the computer 100. The user input device 180 is configured to receive a simple form of user input, such as a single click on a single switch or button, to interact with the computing device 100. In some embodiments, user input device 180 enables user interaction with a customizable input panel with a plurality of keys or buttons to receive different forms of user input instructions (see, for instance, user input panel 710, shown in FIG. 7) to interact with computer 100. The graphics adapter 111 displays images and other information on the display 117. The network adapter 115 couples the computer 100 to a local or wide area network.

As is known in the art, a computer 100 can have different and/or other components than those shown in FIG. 1A. In addition, the computer 100 can lack certain illustrated components. As is known in the art, the computer 100 is adapted to execute computer program modules for providing functionality previously described herein. In one embodiment, program modules are stored on the storage device 107, loaded into memory 105, and executed by the processor 101.

Computing Device

Figure 1B:
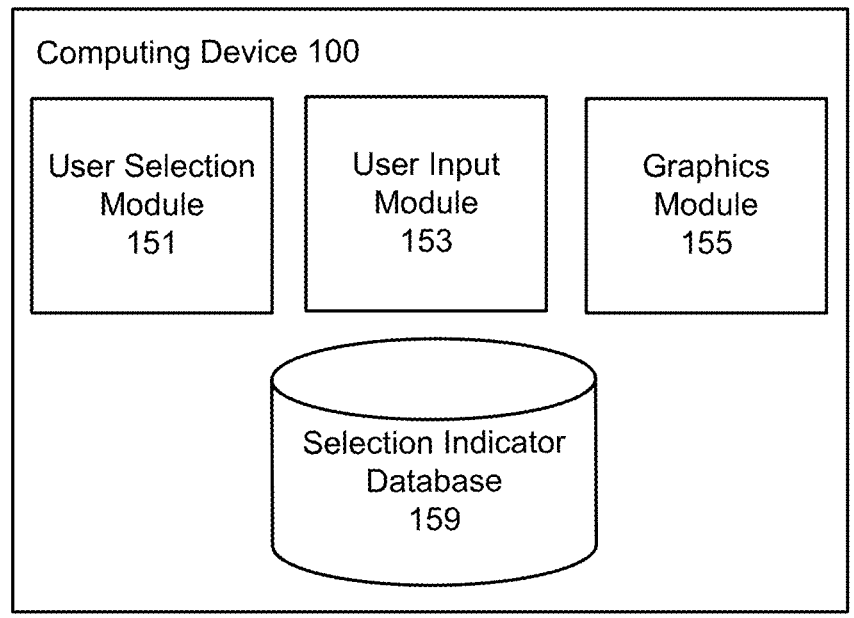
FIG. 1B is a high-level block diagram of a computing device, according to some embodiments.

FIG. 1B is a high-level block diagram of the software architecture of the computing device 100. In one embodiment, the computing device 100 is an electronic device such as a desktop computer (e.g., an Apple iMac™), a laptop computer (e.g., Apple MacBook™), a tablet computer (e.g., Apple iPad™), a mobile phone (e.g., Apple iPhone™), a media device (e.g., Apple iPod™), etc. The computing device 100 may include touch screen, such as one a mobile phone or tablet computer. In alternative embodiments, other computing devices lacking a touch screen can be used in conjunction with other forms of user input devices.

As shown in FIG. 1B, the computing device 100 includes a user selection module 151, a user input module 153, a graphics module 155, and selection indicator database 159, according to some embodiments. As is known in the art, the term "module" refers to computer program logic utilized to provide the specified functionality upon execution by the computing device 100. Other embodiments of the computing device 100 can have different and/or other modules than the ones described here, and that the functionalities can be distributed among the modules in a different manner.

The user selection module 151 includes computer executable instructions to enable users to identify and select regions, portions, locations, or user interface elements displayed on a user interface, and is one means for performing this function. User selection module 151 moves one or more selection indicators (e.g., visually distinguished regions, lines, points) across the user interface, and responsive to receiving user input to stop movement of a selection indicator over a user-desired portion of the user interface, stops movement of the respective selection indicator to identify or select regions, portions, locations, lines, points, or user interface elements of interest to the user.

The user input module 153 detects one or more touch points or contact inputs with a touch screen (hereinafter "display screen") of the computing device 100 or with one or more touch receptive panels, touch sensitive devices, or other user input devices communicatively coupled to the computing device 100, and is one means for performing this function. "Touch point" as used herein is understood to include the plural "touch points." The user input module 153 receives touch data from the display screen or from any touch sensitive surface or input device and determines movement of the touch point based on speed, velocity, pressure, and/or an acceleration of a corresponding contact point. For a stationary contact input, such as a single click, tap gesture and so on, user input module 153 detects one or more of a location, timing, cursor or selection indicator position on the user interface, or any other suitable parameter associated with the stationary contact. For a moving contact, such as a single or multi-finger swipe gesture, a double tap gesture and so on, user input module 153 tracks the movement or any other time-varying attribute of the single or multi-point contact across the display screen or other touch-receptive surface or user input device. The user input module 153 determines if and when the touch or user input has stopped such as the detection of a finger-up event or a break in contact with the display screen or touch receptive surface. These operations may be applied to a single contact (e.g., one finger touch) or to multiple simultaneous contacts.

The user input module 153 detects a gesture input by a user on the computing device 100 or receives a signal corresponding to a gesture input on a user input device communicatively coupled to the computing device 100. Different gestures have different touch patterns. A touch pattern is characterized by one or more touch points and their associated movements, from which the spatial or geometrical relationships between the touch points can be determined. The user input module 153 detects a gesture based on a particular touch pattern on the display screen or other user input device. For example, the user input module 153 detects a finger tap gesture by detecting a finger-down event indicating an initial touch of a position on the display screen or other user input device followed by detecting a finger-up event at substantially the same position where the finger is no longer touching the touch screen or other user input device.

The user input module 153 optionally uses one or more methods for associating a location on a stopped selection indicator overlaid as a layer on the user interface with underlying elements on the actual underlying user interface. In some embodiments, the computing device 100 generates a mouse event (e.g., a click or touch) at a location corresponding to the stopped selection indicator overlaid on the user interface and propagates or passes the mouse event through the overlying layer of the selection indicator to the actual user interface. In alternative embodiments, the computing device simulates a press at location, identifies the location, and then provides the location information for the underling application.

The graphics module 155 renders and displays graphics on the display screen or user interface of the computing device 100, and is one means for performing this function. The term "graphics" includes any object that can be displayed to the user. For example, graphics include text, web pages, icons including user-interface objects including soft keys, digital images, videos, animations, and the like. The graphics module 155 receives and renders display information (e.g., movable or scanning regions or selection indicators) from the user selection module 151 that represents selection or scan regions to display or overlay on the user interface of the computing device 100.

The selection indicator database 159 stores attributes of various movable selection indicators displayed by the graphics module 155 overlaid on the user interface of the computing device 100 to enable users to identify and select locations (e.g., positions, portions, or regions) or user interface elements located on the user interface, and is one means for performing this function. The attributes of the selection indicators may include shapes (e.g., rectangular, polygonal, angular wedge shape, annular shape), dimensions and sizes (e.g., lengths, widths, angular dimensions, perimeter, area), display regions or locations on the user interface, orientations, opacity or transparency, boundary or edge properties (boundary shape, contour, color, and so on), movement directions, movement trajectories, movement speeds, and the like.

Figure 1C:
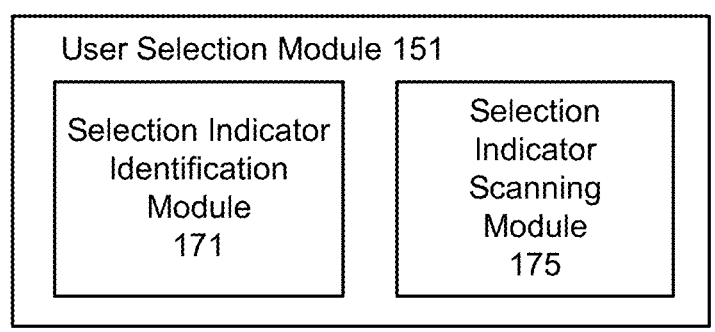

FIG. 1C illustrates a detailed view of one embodiment of the user selection module 151, including a selection indicator identification module 171 and a selection indicator scanning module 175. User selection module 151 enables a user to interact with the user interface displayed on the computer 100 (e.g., to select a user-desired location or to select or move a user interface element on the user interface) via one or more movable selection indicators displayed on the user interface. Accordingly, the user selection module 151 identifies the one or more movable selection indicators, formats visual display properties of the identified selection indicators, and scans portions of the user interface using the movable selection indicators to enable to user to identify a location of the user interface from among the scanned portions. The user selection module 151 is one means for performing these functions. Selection indicator identification module 171 identifies and retrieves geometric and graphical attributes of the first movable selection indicator stored in the selection indicator database 159. Such attributes of the first movable selection indicator include shapes, dimensions, positions, orientation, color, border effects, transparency or opacity, and the like. Based on the selected attributes of the first movable selection indicator, the selection indicator identification module 171 formats the first movable selection indicator for display or to be overlaid on the user interface. Furthermore, the selection indicator identification module 171 identifies and retrieves the attributes of the second movable selection indicator from selection indicator database 159. For example, for a rectangular visually distinguished region, the second selection indicator is optionally selected to be a straight line that lies within the rectangular visually distinguished region (see, for instance, FIG. 3C). As another example, for a wedge-shaped visually distinguished region, the second selection indicator is selected to be a straight radial line that lies within the wedge-shaped movable selection indicator (see, for instance, FIG. 5C). As yet another example, for an annular visually distinguished region, the second selection indicator is selected to be a circular line that lies within the annular movable selection indicator (see, for instance, FIG. 6C).

Selection indicator scanning module 175 retrieves movement attributes of the first movable selection region stored in the selection indicator database 159, based on the first selection indicator identified by the selection indicator identification module 171, and is one means for performing this function. Such movement attributes or scan properties include movement direction, movement trajectory, movement speed, and the like. In some embodiments, the selection indicator scanning module 175 retrieves one or more of the movement attributes as input from the user operating the computing device 100. For example, the user may select or otherwise provide a movement speed, a movement trajectory, a movement direction, a number of scan cycles across the user interface, or any other suitable movement parameter for the movable selection indicator. For instance, for a rectangular first selection indicator aligned parallel to a long axis of the user interface, a movement direction selected by the selection indicator scanning module 175 is parallel to the short axis of the device (see, for instance, FIG. 3A). As another example, for a wedge-shaped first selection indicator, a movement direction selected by the selection indicator scanning module 175 is an angular clockwise or counter clock-wise rotational direction (see, for instance, FIG. 5A). As yet another example, for an annular first selection indicator, a movement direction selected by the selection indicator scanning module 175 is a radial direction toward or away from a central location of the annular first selection indicator (see, for instance, FIG. 6A).

Selection indicator scanning module 175 further retrieves one or more movement properties or attributes of the second movable selection indicator stored in the selection indicator database 159, based on the second selection indicator identified by the selection indicator identification module 171 and based on the movement attributes or scan properties of the first selection region selected by the selection indicator scanning module 175. For instance, for a rectangular first selection indicator aligned parallel to a long axis of the user interface and having a movement direction parallel to the short axis of the user interface, the second selection indicator scan module 175 selects a movement direction of the straight line (second selection indicator) displayed within the rectangular first selection indicator to be parallel to the short axis of the device (see, for instance, FIG. 3C). The selection indicator scan module 175 further limits a movement range of a straight line-shaped second selection indicator within the rectangular first selection indicator. As another example, for a wedge-shaped first selection indicator having an angular clockwise movement direction, the selection indicator scan module 175 moves the radial line second selection indicator in a clockwise direction within the wedge-shaped region (see, for instance, FIG. 5C). As yet another example, for an annular first selection indicator moved in a radial direction away from a central location of the annular first selection indicator, the selection indicator scan module 175 moves the circular line shaped second selection indicator away from the central location of the annular first selection indicator, within the confines of the annular first selection indicator (see, for instance, FIG. 6C).

Method of Using Moving Regions for Point or Region Selection

FIG. 2 includes a flowchart illustrating method for point or region selection using gliding regions, for use with assistive scanning software, according to some embodiments.

A computing device displays 210 a first selection indicator overlaid on the user interface. For example, as shown in FIG. 3A, selection indicator 350 is overlaid on user interface 300; as shown in FIG. 4A, selection indicator 450 is overlaid on user interface 300; as shown in FIG. 5A, selection indicator 550 is overlaid on user interface 300; as shown in FIG. 6A, selection indicator 650 is overlaid on user interface 300, and the like. In some embodiments, displaying the first selection indicator overlaid on the user interface comprises displaying the first selection indicator within an area of an application window displayed on the user interface (e.g., first selection indicator 750 is displayed within an area of the application window 720, which in turn is displayed on the desktop user interface 700, as shown in FIG. 7), the area of the application window corresponding to a subregion of the user interface.

The computing device moves 220 the first selection indicator in a first direction. For example, as shown in FIG. 3A, selection indicator 350 is moved in a direction 355; as shown in FIG. 4A, selection indicator 450 is moved in a direction 455; as shown in FIG. 5A, selection indicator 550 is moved in a direction 560; as shown in FIG. 6A, selection indicator 650 is moved in a direction 655, and the like. In embodiments where the first selection indicator (e.g., first selection indicator 750, as shown in FIG. 7) is displayed within an area of an application window displayed on the user interface (e.g., application window 720 displayed on the desktop user interface 700, as shown in FIG. 7), moving the first selection indicator comprises moving the selection indicator within the area of the application window (e.g., movement of selection indicator 750 is confined within an area of application window 720, as shown in FIG. 7).

Responsive to receiving a first user input to stop movement of the first selection indicator, the computing device ceases 230 movement of the first selection indicator over a first portion of the user interface. For example, as shown in FIG. 3B, movement of selection indicator 350 is stopped on the user interface; as shown in FIG. 5B, selection indicator 550 is stopped on the user interface; as shown in FIG. 6B, selection indicator 650 is stopped on the user interface, and the like.

In various embodiments, the first selection indicator can take various shapes and move in various manners. For example, as shown in FIG. 3A, one embodiment of the first selection indicator is a rectangular region extending between a pair of parallel edges. Alternatively, as illustrated FIGS. 4A-4B, the first selection indicator may be a polygonal region comprising a pair of parallel edges oriented at a specified angle to a long axis the user interface. As illustrated in FIGS. 5A-5F, the first selection indicator may be an angular wedge bounded by a pair of radial edges extending from a given location on the user interface and being at a specified angle to each other. As illustrated in FIGS. 6A-6E, the first selection indicator may be an annular region bounded by a pair of circles, at least one given circle of the pair of circles centered at a given location of the user interface.

As illustrated in FIGS. 3I-3K, the computing device can visually emphasizes the first pair of edges 352, 354 of the first selection indicator against varying local background conditions of the user interface in a vicinity of the first selection indicator, by selecting display parameters of the first pair of edges to contrast against both a maximum and a minimum value of a display property of the background region of the user interface (e.g., dark and light borders of the first pair of parallel edges 352, 354). In some embodiments, the computing device visually emphasizes (e.g., displays in a lighter color, under conditions of higher opacity) one or more user interface elements located on the user interface within a region associated with the first selection indicator.

As explained with reference to FIGS. 3I-3K, upon reaching an edge, boundary, or perimeter of the user interface, movement of the first selection indicator is reversed. While moving the first selection indicator in a first direction, prior to receiving the first user input, the computing device determines that a respective edge of the first selection indicator is within a first specified distance of a boundary of the user interface. Responsive to the determining, the computing device reverses movement of the first selection indicator on the user interface, by moving a displayed portion of the first selection indicator in a direction opposite to the first direction.

For example, as illustrated in FIGS. 3I-3K, where the first selection indicator is a rectangular region 350 extending between a first pair of parallel edges (e.g., 352 and 354), responsive to determining that a respective leading edge (e.g., 354) of the first pair of edges is within a first specified distance of a boundary of the user interface, the computing device ceases to display the respective leading edge and a first portion of the first selection indicator on the user interface, as shown in FIG. 3I-3J. In such embodiments, and as shown in FIG. 3J, the computing device continues to display a second portion of the first selection indicator and a respective trailing edge (e.g., 352) of the first pair of parallel edges on the user interface. Further, the computing device moves the respective trailing edge toward the boundary of the user interface in the first direction. Responsive to determining that the respective trailing edge is within a second specified distance of the boundary of the user interface, as illustrated in FIG. 3J, the computing device ceases movement of the respective trailing edge toward the boundary in the first direction. After a specified interval of time of ceasing movement of the respective trailing edge, in the absence of the first user input and as shown in FIG. 3K, the computing device reverses movement of the first selection indicator on the user interface, by moving the respective trailing edge and a displayed portion of the first selection indicator in a fourth direction, the fourth direction being parallel and opposite to the first direction (e.g., 385 being parallel and opposite to 355).

Referring again to FIG. 2, while displaying the first selection indicator over the first portion of the user interface, the computing device performs steps 240-260 described below. The computing device displays 240 a second selection indicator overlaid on the user interface and moves 250 the second selection indicator in a second direction. For example, and as will be explained further with reference to FIGS. 3A-3K, where the first selection indicator is a rectangular region 350 extending between a first pair of parallel edges, the first direction is orthogonal to the first pair of parallel edges. In this example, as illustrated in FIGS. 3G-3H, the second selection indicator is optionally a rectangular region 360 extending between a second pair of parallel edges (e.g., 362 and 364), the second pair of parallel edges is orthogonal to the first pair of parallel edges, and the second direction 365 is orthogonal to the first direction. In alternative embodiments, as illustrated in FIGS. 3C-3F, the second selection indicator comprises a straight line 370 lying between and parallel to the first pair of parallel edges, the second direction 375 is parallel to the first direction, and movement of the second selection indicator is confined between the first pair of parallel edges.

As another example, as will be described with reference to FIGS. 4A-4B, where the first selection indicator is a polygonal region 450 comprising a first pair of parallel edges (e.g., 452 and 454) oriented at a specified angle 420 to a long axis the user interface, the first direction 455 is orthogonal to the first pair of parallel edges. Further, in such embodiments, the second selection indicator is a polygonal region 460 comprising a second pair of parallel edges (e.g., 462 and 464), the second pair of parallel edges orthogonal to the first pair of parallel edges and oriented at the specified angle 430 to a short axis of the user interface and the second direction (e.g., direction of movement of 460) is orthogonal to the first direction (e.g., direction of movement of 450).

As yet another example, as explained with reference to FIGS. 5A-5F, where the first selection indicator comprises an angular wedge 550 bounded by a pair of radial edges (e.g., 552 and 554) extending from a given location 520 on the user interface, movement of the first selection indicator corresponds to a rotation of the angular wedge 550 around the given location. In such embodiments, the first direction 560 corresponds to an angular direction of the rotational movement of the angular wedge. In such embodiments, the second selection indicator comprises a radial line 580 extending from the given location 520 on the user interface, the radial line lying between the radial edges of the angular wedge. In some embodiments, movement of the second selection indicator in a second direction comprises a rotation 575 of the radial line about the given location; the radial line rotationally traverses at least a portion of the angular wedge, the rotation confined between the pair of radial edges of the angular wedge, as illustrated in FIGS. 5C-5D. In such embodiments, the computing device moves a third selection indicator 590 along the radial line 580.

In yet another example, as illustrated in FIGS. 6A-6E, the first selection indicator is an annular region 650 bounded by a pair of circles (e.g., 652 and 654), at least one given circle of the pair of circles centered at a given location of the user interface. In such embodiments, movement of the first selection indicator comprises a radial movement 655 of the given circle of the pair of circles toward or away from the given location, the radial movement based on varying a radius of the given circle. In such embodiments, the second selection indicator comprises an additional circle 670 centered at a respective location of the user interface, the additional circle 670 lying within the annular region based on the respective location lying within an inner circle 652 of the pair of circles and based on a radius of the additional circle being less than a radius of an outer circle 654 of the pair of circles and greater than a radius of the inner circle of the pair of circles, as illustrated in FIG. 6C. In some embodiments, movement of the second selection indicator in a second direction comprises a radial movement 675 of the additional circle toward or away from the respective location, by varying a radius of the additional circle; the radial movement constrained between the outer circle and the inner circle of the pair of circles.

Referring again to FIG. 2, responsive to receiving a second user input to stop movement of the second selection indicator the computing device ceases 260 movement of the second selection indicator over a second location of the user interface. For example, as shown in FIGS. 3D, 3H, 4B, 5D, 6D illustrate various configurations with the second selection indicator stopped at a second location (e.g., position, region) on the user interface in response to a second user input.

The computing device determines 270 the user-selected portion of, or location on, the user interface based at least in part on the first and the second locations of the user interface. In some embodiments, where the selection indicator comprises a line lying within the first region, the computing device moves a user interface element along a movement trajectory defined by the line. Then, in such embodiments, the device successively or sequentially scans or traverses the user interface with varying degrees of granularity, span expanse (traversal area), or improved spatial resolution, thereby allowing the user to identify a desired location (e.g., position, region, or portion) of the user interface, without having to move a finger across a track pad or touchscreen or without moving a mouse to identify the desired portion of the user interface. In such embodiments, where the device successively or sequentially scans or traverses the user interface with varying degrees of granularity or improved spatial resolution, the device optionally varies a scan speed or traversal rate based on the span expanse (traversal area). For example, the device traverses a larger scan area at a faster scan rate than a smaller scan area.

For example, in embodiments where, the first selection indicator is a rectangular region extending between a first pair of parallel edges, as illustrated in FIGS. 3A-3F, and the second selection indicator comprises a straight line lying between and parallel to the first pair of parallel edges, the computing device moves a third selection indicator along the straight line. In embodiments where, the first selection indicator is an annular region and the selection indicator is an additional circle, as illustrated in FIGS. 6A-6E, the computing device moves a user interface element along a circumference of the additional circle. In some embodiments, as illustrated in FIGS. 5A-5F, where the first selection indicator is wedge, and the second selection indicator is a radial line, the computing device moves a third selection indicator along the radial line, as shown in FIG. 5E.

Referring again to FIG. 2, responsive to receiving a third user input to stop movement of the user interface element, the computing device ceases movement of the user interface element over a third portion of the user interface. The computing device determines the user-selected portion of, or location on, the user interface based at least in part on the third portion of the user interface. In some embodiments, as explained with reference to FIGS. 3F, 3H, 4B, 5F, and 6E, the computing device selects a user interface element (e.g., 390, 490, 598, 690, respectively) lying within a specified proximity threshold of the user-selected location of the user interface.

In some embodiments, the computing device provides, via a selection panel (e.g., user input panel 810 shown in FIG. 8), one or more selectable options (e.g., options 820-1, 820-2, 820-3, 820-4 illustrated in FIG. 8) to enable a user to interact with the user-selected location of the user interface.

Rectangular Moving Regions

FIG. 3A illustrates an example of a user interface 300 displayed on a computing device. The user interface 300 includes a plurality of user interface elements (including UI icons corresponding to 'Messages,' 'Calendar,' 'Calculator,' 'Music,' 'Mail,' 'Weather,' 'Browser,' 'Notes,' and 'Facetime' applications). Examples of such UI elements include user interactive icons (such as desktop icons for files, folders, desktop application shortcuts), other user interactive elements (such as user interactive regions in a browser—text entry regions, scroll bars, user selection elements such as drop down menus, radio buttons), graphical icons (such as thumb nails), other graphical elements (pictures or images embedded in a webpage), and the like.

In this example, a user wishes to select a specified location (e.g., position, region, or portion) of the user interface or user interface element (e.g., icon 390 for the 'Notes' application) on the user interface while sustaining reduced movement and motor effort. In order to allow user selection of the desired user interface element, the computing device scans at least a portion of the surface of the user interface to enable the user to identify (e.g., via activation of a simple switch, single click, or other convenient user input that involves minimal motor effort using a simple user input device) a first location (e.g., position, region, or portion) of the user interface at or within which the desired user interface element is located. In some embodiments, the device then further scans the user interface to narrow down or identify a second location (e.g., position, region, or portion) of the user interface, and so on, until the device identifies the specified or desired user interface element or the user-specified location (e.g., position, region, or portion) of the user interface. In some embodiments, the device successively or sequentially scans the user interface with varying degrees of granularity or improved spatial resolution, thereby allowing the user to identify a desired location (e.g., position, region, or portion) of the user interface, without having to move a finger across a track pad or touchscreen or without moving a mouse to identify the desired portion of the user interface. For example, as shown in FIGS. 3A-3F, the device first scans a larger spatial expanse or traversal area (FIGS. 3A-3B) with coarser granularity (e.g., using a larger selection indicator 350). The device optionally scans the larger traversal area with a higher scan rate or scan speed. Then, the device sequentially scans a smaller traversal area (FIGS. 3C-3D) with finer granularity (e.g., using a finer selection indicator 370). The device optionally scans the smaller traversal area with a lower scan rate or scan speed. Then, the device further scans an even smaller traversal region (FIGS. 3E-3F) with even finer granularity (e.g., using a finer selection indicator 380); the device optionally further reduces the scan rate or scan speed.

In some embodiments, the device uses various combinations of shapes, locations, sizes, contours, configurations, orientations of movable selection indicators to scan or traverse the user interface. Such shapes may include polygonal, rectangular, annular, wedge, straight lines, circular lines, radial lines, and the like. Movement directions include vertical or horizontal directions (aligned to the long or short axes of the user interface), diagonal or inclined direction (at an angle to the long or short axes of the user interface), radial direction toward or away from a specified location on the user interface, rotational angular direction (e.g., clockwise or counter clockwise), along a linear trajectory and so on. In some embodiments, a range of movement is constrained to a specified plane (for example, a 2D plane orthogonal to the user's line of sight); in alternative embodiments, such as with 3D screens, a movement direction optionally includes a direction orthogonal to the plane of the screen and along the user's line of sight. In some embodiments, the movement span or traversal region of the selection indicators is constrained to a specified portion of the user interface; for example, the movement span or traversal region is optionally constrained to a specified screen of a multi-screen display. In some embodiments, the first selection indicator traverses a larger area or span than the second selection indicator; in such embodiments, the first selection indicator is moved at a first speed that is greater than a second speed at which the second selection indicator is moved.

Accordingly, in some embodiments, a first selection indicator, such as movable rectangular region 350 shown in FIG. 3A is displayed or overlaid on the user interface. Although shown in FIG. 3A as a rectangular region, the first selection indicator can have a variety of shapes (as discussed above and described with reference to FIGS. 4A-4B, 5A-5F, and 6A-6E). Selection indicator 350 optionally extends from one side 320 of the user interface to another side 330 of the user interface. In this example, the selection indicator 350 is a rectangle spanning a vertical length and moved horizontally along the user interface, and thus the two sides 320 and 340 are opposite, parallel edges and the selection indicator lies between a first pair of parallel edges 352 and 354. Selection indicator 350 is optionally visually distinguished by emphasizing a border around the selection indicator, by distinguishably color coding the region, by emphasizing a portion of the user interface over which the region is overlaid at any given time, by de-emphasizing the portion of the user interface over which the selection indicator is overlaid (e.g., by increasing the opacity of the region above a specified opacity threshold), and so on.

The first selection indicator 350 is moved in a first direction 355 as shown in FIG. 3A, for example, toward a right side of the user interface. In this movement direction, 352 is a trailing edge and 354 is a leading edge of the rectangular visually distinguished region, by virtue of edge 352 trailing or following edge 354 in the first direction 355 of movement of the first selection indicator. Upon receiving a first user input to stop movement of the region 350 (e.g., via a single click performed on a simple user input device, such as user input device 180 described in FIG. 1D), region 350 is stopped over a first portion of the user interface as shown in FIG. 3B.

In some embodiments, after ceasing movement of region 350 over the first region of the user interface and while displaying region 350 over the first region of the user interface, a second selection indicator such as line 370 is displayed on the user interface, as illustrated in FIG. 3C. In some embodiments, selection indicator or line 370 is displayed parallel to the first pair of parallel edges of region 350. Selection indicator or line 370 is moved in a second direction 375 (e.g., in this example, to the second direction is the same as the first direction 355). In such embodiments, movement of 370 optionally starts at the trailing edge 352 of region 350. Upon receiving a second user input to stop movement of the selection indicator 370 (e.g., via a single click performed on a simple user input device), selection indicator 370 is stopped over a second portion of the user interface as shown in FIG. 3D. The user-selected location (e.g., position or region) of the user interface is determined based at least in part on the first and the second locations of the user interface (e.g., an intersection or overlap of the first and the second locations) and the device concludes that the user-selected location is the location of the user interface desired or identified by the user.

In some embodiments, there are more than two selection indicators used. For example, while displaying the first selection indicator 350 and the second selection indicator 370 on the user interface, a third selection indicator (e.g., a user interface element 380) is displayed, as shown in FIG. 3E. In other embodiments, e.g., one in which the first selection indicator is a rectangle in a first direction and the second selection indicator is a rectangle in a second direction, the intersection of the two selection indicators is a region bound on four sides (two by each indicator), and the user selection process concludes that the intersection region contains or corresponds to the location on the user interface that the user wishes to select.

Referring again to the embodiment displayed in FIG. 3E, the third selection indicator 380 is moved along the second selection indicator or line 370 in a third direction 385—for example, as shown, in a direction orthogonal to the first and second directions 355 and 375. Upon receiving a third user input to stop movement of the user interface element 380, the user interface element 380 is stopped over a third portion of the user interface as shown in FIG. 3F. The third portion of the user interface is selected as a user-selected location on the user interface. In some embodiments, a user interface element located within or near (e.g., within a specified proximity range) of the third portion of the user interface is identified as the user-selected portion of the user interface.

In some embodiments, as described with reference to FIGS. 3A-3F, in order to select a specified user interface element, the device moves a rectangular visually distinguished region 350 over the user interface until the device receives a first user input to stop movement of the region 350 over a first portion of the user interface. Then, the device moves a selection indicator or line 370 within the first portion of the user interface until the device receives a second user input to stop movement of the line 370 over a second portion of the user interface. Finally, the device moves a user interface element 380 along line 370 until the device receives a third user input to stop movement of the user interface element 380 to identify the user-selected location (e.g., position or portion) of the user interface, and optionally, a user interface element near the user-selected portion of the user interface.

Alternatively, as illustrated in FIG. 3G, in some embodiments, after stopping the first selection indicator 350 in the first region of the display (as described with reference to FIGS. 3A-3B), the device displays a second selection indicator (for example, rectangular region 360) as a selection indicator, over the user interface. The rectangular region 360 optionally extends between parallel sides of the user interface and is bounded by a second pair of parallel edges 362 and 364. In another embodiment, the second selection indicator 360 spans only the width of the first selection indicator 350 rather than the entire UI 300 width. The device moves the rectangular region 360 in a second direction 365—for example, orthogonal to the first direction 355 described with reference to FIG. 3A. Upon receiving a second user input to stop movement of the second selection indicator 360, selection indicator 360 is stopped over a second location of the user interface as shown in FIG. 3H. A portion of the user interface formed by the intersection of the first selection indicator 350 and second selection indicator 360 is identified as the user-selected portion of the user interface, and optionally, a user interface element located within or near the user-selected portion of the user interface (e.g., UI element 323, in this instance) is identified as a user-specified or user-desired UI element.

Display properties of a user interface frequently vary across an area of the user interface. For example, colors, brightness or intensities, saturation, contrast, and so on may vary across regions of user interface. In some embodiments, in order to visually emphasize and distinguish the movable selection indicators over the background regions, one or more properties of the movable selection indicators may be selected so as to enable the movable selection indicators to stand out against a wide dynamic range of display properties of the user interface. For example, FIGS. 3I-3K illustrate selecting a combination of dark and light colored borders of the selection indicators in order to contrast against varying background conditions (dark or light colored backgrounds). Similarly the selection indicator is optionally selected to have a combination of dark and light colors to be distinguished over the varying background regions of the user interface. In some embodiments, as shown in FIG. 3I-3K, the device visually emphasizes (e.g., displays more or less prominently, in a different color, and so on) one or more user interface elements (e.g., icons for 'Calculator,' 'Music,' 'Browser,' and 'Notes' applications) located on the user interface within a region associated with or underlying the first selection indicator.

Furthermore, as shown in FIGS. 3I-3K, when the first selection indicator approaches a border or edge of the user interface, in the absence of a user's input to stop movement of the first selection indicator, the first selection indicator would continue moving toward and off the border or edge of the user interface. As shown in FIG. 3I, a first portion and a leading edge (in the movement direction) of the first selection indicator would accordingly cease to be displayed on the user interface, as if moved "off" the user interface, while a second portion and a trailing edge would continue to be displayed on the user interface and move toward a border of the user interface. When the trailing edge of the first selection indicator approaches a boundary of the user interface within a specified distance of the boundary, as shown in FIGS. 3I-3K, movement of the first selection indicator in the first direction pauses for a specified (e.g., predetermined) amount of time. Following this, movement of the first selection indicator reverses and the first selection indicator moves in a direction 385 parallel, but opposite to the first direction 355.

Polygonal Moving Regions

Referring now to FIGS. 4A-4B, according to some embodiments, a first selection indicator 450 is displayed on the user interface and has a polygonal shape and a first pair of parallel edges 452 and 454. The first pair of parallel edges 452 and 454 are oriented at a first specified angle 420 (e.g., an acute angle) to a long axis of the user interface. The direction of movement 455 of the region 450 is optionally orthogonal to the first pair of parallel edges 452 and 454. In some embodiments, the first selection indicator 450, extends across a portion of the user interface and shares one or more edges with at least a portion of the perimeter or boundary of the user interface. Accordingly, as the first selection indicator moves across the user interface, a shape and perimeter of the first selection indicator optionally varies to conform to the varying contour of the boundary of the user interface along the movement trajectory of the first selection indicator. For example, movement of region 450 from the position in FIG. 4A to FIG. 4B is accompanied with a change in the shape and perimeter of region 450.

In some embodiments, as explained above with reference to FIGS. 3G-3H, upon receiving user input to stop movement of the first selection indicator 450 over a first region of the user interface, a second selection indicator 460 is displayed on the user interface. The second selection indicator 460 optionally has a polygonal shape and is bounded between a second pair of parallel edges 462 and 464. The second selection indicator 460 is displayed at a specified angle 430 (e.g., an acute angle) relative to a respective axis (e.g., in FIG. 4B, the short axis) of the user interface. In some embodiments, the second selection indicator 460, extends across a portion of the area of the user interface and shares one or more edges with at least a portion of the perimeter of the user interface. The shape of the second selection indicator or polygonal region 460 also optionally varies to conform to the varying contour of the boundary of the user interface along the movement trajectory of the second selection indicator.

Rotating Wedge Region

In yet another example, a user wishes to select UI icon 598 on the user interface of FIGS. 5A-5F. As explained above with reference to FIGS. 3A-3K, in some embodiments, a plurality of successively moving selection indicators are moved across the user interface so that the user may narrow down the portion of the user interface to be selected. FIG. 5A illustrates the first selection indicator 550 shaped as a wedge and bounded by a pair of lines 552 and 554 extending from a specified location 520 or point, on the user interface, optionally toward a periphery of the user interface. The pair of lines 552 and 554 subtends a specified angle 570 at the specified location 520. In some embodiments, a position of the specified location 520 coincides with a geometric center of the user interface. In some embodiments, a position of the specified location 520 could be determined or varied based on a variety of criteria such as, a density of user interface elements in a particular region of the user interface, a likelihood of the user selecting a user interface element in a given region based on past user selection patterns, based on user specification or preference, and so on.

In some embodiments, as illustrated in FIG. 5A, the first selection indicator or wedge 550 is moved (e.g., rotated about the specified location 520) in a first direction 560 (e.g., in an angular direction such as a clockwise or a counter clockwise direction). Responsive to receiving a user input to stop movement of the first selection indicator region or wedge 550, the wedge 550 is stopped over a first region of the user interface as shown in FIG. 5B, the first region optionally encompassing the desired user interface element 515.

As shown in FIG. 5C, in some embodiments, with the wedge 550 displayed over the first region, a second selection indicator or radial line 580 is displayed within the first selection indicator or wedge 550. The selection indicator 580 is moved in a second direction 575. For example, selection indicator 580 is moved between the first radial edge 552 and the second radial edge 554 of the wedge; the movement of the second selection indicator 580 is confined within the angular wedge 550. Upon receiving a user input to stop movement of the line 580, line 580 is stopped over a second region of the user interface as shown in FIG. 5D, optionally over or in the vicinity of the desired user interface element 515.

As shown in FIG. 5E, a third selection indicator 585 is moved along radial line or selection indicator 580 in a third direction 585 (e.g., radially toward or away from the specified location 520). Upon receiving user input to stop movement of the user interface element 580, as shown in FIG. 5F, the user interface element 590 is stopped over a third region of, or a particular location on, the user interface. The user-selected location (e.g., position or region) of the user interface is determined based at least in part on the first and the second locations of the user interface (e.g., an intersection or overlap of the first and the second locations) and the computing device concludes that the user-selected location is the location of the user interface desired or identified by the user.

In some embodiments, as shown in FIG. 5F, a user interface element, such as UI element 598 (e.g., the 'Notes' icon 598), located within a specified proximity threshold of the stopped third selection indicator or user interface element 590 is identified as the user-selected user interface element. The specified proximity threshold may be computed based on the user interface element lying within a specified spatial distance along the radial line 580 or within a region 597 encompassed by specified radius. This would allow for a certain measure of error or discrepancy (e.g., delay or latency in user reaction time) between positioning of the moving user interface element on the user interface and receiving the user input to stop movement of the moving user interface element.

Radially Moving Annular Region

FIGS. 6A-6E illustrate yet another example of using sequentially moving regions and/or selection indicators for identifying user-selected portions or UI elements on a user interface. For purpose of this example, consider that a user wishes to select the 'Facetime' icon 690. A first selection indicator 650 is displayed, overlaid, on the user interface. In this example, the first selection indicator is shaped as an annular region bounded or defined between a pair of circles 652 and 654. In some embodiments, the pair of circles are concentric as shown in FIG. 6A. In alternative embodiments, the pair of circles have distinct and mutually offset centers, but an outer circle optionally fully encompasses an inner circle to form an annular region or area lying between the outer and inner circles.

In some embodiments, a central position of the annular region 650 could be determined or varied based on a variety of criteria such as, a density of user interface elements in a particular region of the user interface, a likelihood of the user selecting a user interface element in a given region based on past user selection patterns, based on user specification or preference, and so on.

As shown in FIG. 6A, the annular region 650 is moved in a first direction 655 (e.g., radially outward or inward, away from or toward a center of one or both of the circles). In some embodiments, a radius of one or both circles is varied to move the annular region 650 in the first direction 655, thereby varying a size of one or both circles. As shown in FIGS. 6A-6B, respective radii of both circles 652 and 654 are varied to move the annular region 650 away from a center of the circles. Responsive to receiving a user input to stop movement of the annular region 650, the region 650 is stopped over a first portion of the user interface as shown in FIG. 6A.

As shown in FIG. 6C, a selection indicator in the form of an additional circle 670 is displayed within the first annular region 650. In some embodiments, the additional circle lies within the annular region based on the center of the additional circle lying within an inner circle of the pair of circles (e.g., circle 652) and based on a radius of the additional circle being less than a radius of an outer circle of the pair of circles (e.g., circle 654) and greater than a radius of the inner circle of the pair of circles (e.g., circle 652). In some embodiments, the selection indicator or additional circle 670 is moved in a second direction 675 such as a radial direction toward or away from the center of the additional circle, by varying a radius of the additional circle 670. In some embodiments, the radial movement is constrained between the outer circle 654 and the inner circle 652 of the pair of circles that form the annular region 650.

Responsive to receiving a user input to stop movement of the second selection indicator or additional circle 670, the additional circle 670 is stopped over a second location of the user interface, as shown in FIG. 6D. A location (e.g., position, region, or portion) of the user interface is optionally selected based on the stopped second selection indicator. Thus, in some embodiments, the user-selected location (e.g., position or region) of the user interface is determined based at least in part on the first and the second locations of the user interface (e.g., an intersection or overlap of the first and the second locations) and the device concludes that the user-selected location is the location of the user interface desired or identified by the user.

In some embodiments, a third selection indicator (e.g., user interface element 680) is displayed on the second selection indicator or additional circle 670 and moved in a third direction, such as a circumferential direction 685, along a trajectory defined by the additional circle 670, as shown in FIG. 6D.

Responsive to receiving a user input to stop movement of the user interface element 680 at a specified location on the user interface, the user interface element 680 is stopped over a third location (e.g., position or region) of the user interface. In some embodiments, a user interface element 690 ('Facetime' icon) lying in the vicinity of or within a specified proximity threshold of the user-selected portion of the user interface is selected or identified as the user-specified UI element. Alternatively, the user-selected location (e.g., position or region) of the user interface is determined based at least in part on the third location of the user interface and the device concludes that the user-selected location is the third location of the user interface desired or identified by the user.

FIG. 7 illustrates yet another example of using sequentially moving regions and/or selection indicators for identifying user-selected portions or UI elements on a user interface, within a portion of the user interface. In this example, a user wishes to select the 'Apple Store' bookmark from among the drop down bookmark options in a browser application window 720 displayed in a portion or subregion of the desktop user interface 700. In order to facilitate user selection of the desired bookmark without the movement of a mouse or finger over a trackpad, movable selection indicators 750, 760, and 770 scan the user interface, or a portion thereof, to enable the user to indicate selection of the desired dropdown option simply by allowing the user to provide a user input to stop movement of the selection indicators when they are displayed over the desired portion of the user interface.

As illustrated in FIG. 7, selection indicators 750, 760, and 770 are displayed over and moved within the browser application window 720 displayed within the user interface 700, rather than across the entire user interface as in the previous examples. In this example, the application window 720, in turn, occupies and is displayed within a specified portion or region of the user interface 700; in other words, application window 720 does not or encompass the entire region of user interface 700. In such embodiments, movement of the first selection indicator 750 is confined or bounded within an area of the application window 720 as shown in FIG. 7; movement of the second selection indicator 760 is confined within the stopped first selection indicator 750, and movement of the third selection indicator is along a trajectory defined by the stopped second selection indicator 760.

In other words, although the selection indicators illustrated and described with reference to FIGS. 3A-3K, 4A-4B, 5A-5F, and 6A-6E are described as being enabled to move across or scan a complete area of the displayed user interface, in some embodiments, as shown in FIG. 7, the selection indicators are displayed over and moved within a specified area or predefined spatial region that spans a portion, subset, or subregion of the user interface as opposed to the entire area of the user interface. This specified area or predefined spatial region optionally corresponds to an area of an application window as shown in FIG. 7.

Thus, a user is enabled to select or identify desired locations or UI elements of a user interface by pausing movement of moving regions, selection indicators, or user interface elements over or in the vicinity of the desired location or UI element of the user interface (e.g., via a single click or activation of a simple switch), without having to perform significant hand movement to move a mouse, finger over a trackpad or touchscreen, and so.

User Input Panel for Interacting with a User-Selected Location or User Interface Element In some embodiments, upon selection of a user-specified or user-desired location on the user interface (as described with reference to FIGS. 3F, 3H, 5F, 6E, 7 and so on), as shown in FIG. 8, a user input panel 810 with a (e.g., configurable) set of user interactive elements or keys is displayed on the user interface of a user interface device 800. A user can provide a user input (e.g., a single click, activation of a switch, press of a button, and so on) via a simple user input device (such as user input device 180 of FIG. 1A) to select one of the keys (e.g., Click 820-1, Click and Hold 820-2, Click and Drag 820-3, Right Click 820-4, and so on) of the set of keys displayed on panel 810 to perform a corresponding action at the user-selected location (e.g., the user-selected location illustrated and described with reference to FIGS. 3F, 3H, 5F, 6E, 7 and so on). The user can configure and then use such user interactive elements to select or specify one or more attributes of the movable selection indicators; indicate a direction, trajectory, speed of motion of the movable selection indicators; indicate that motion of the movable regions be stopped at a specified location (e.g., position, region, or location). In addition, the user can configure or map the keys to various different single finger or multi-finger gestures, including a tap, flick, stop, pinch, pan, tap and hold, double tap, drag, freehand gesture, and so on. Selected user interface elements (e.g., the 'Notes' icon 390 of FIG. 3F; 'Weather' icon 490 of FIG. 4B; the 'Notes' icon 598 of FIG. 5F; or 'Facetime' icon 690 of FIG. 6E; or the 'Apple Store' drop down option of FIG. 7) on the user interface can be selected, for instance via activation of the "click and hold" key 820-2; on the other hand, user interface elements can be moved via activation of the "click and drag" key 820-3; movement of an element can be stopped via activation of the "right click" key 820-4; and so on.

The disclosure herein has been described in particular detail with respect to one possible embodiment. Those of skill in the art will appreciate that other embodiments optionally are practiced. First, the particular naming of the components and variables, capitalization of terms, the attributes, data structures, or any other programming or structural aspect is not mandatory or significant, and the mechanisms that implement the invention or its features have different names, formats, or protocols in some embodiments. Also, the particular division of functionality between the various system components described herein is merely exemplary, and not mandatory; functions performed by a single system component optionally are instead performed by multiple components, and functions performed by multiple components optionally are instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems also optionally are used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages optionally are used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks includes storage devices and computers that are communicatively coupled to dissimilar computers and storage devices over a network, such as the Internet.

Finally, it should be noted that the language used in the specification has been principally selected for readability and instructional purposes, and have not been selected specifically to delineate or circumscribe the inventive subject matter. Accordingly, the disclosure herein is intended to be illustrative, but not limiting, of the scope of the invention, which is set forth in the following claims.

What is claimed is:

1. A method, comprising:
at a computer system that is in communication with a display and one or more input devices:
while a first selection indicator is overlaid on the user interface, moving the first selection indicator in a first direction, wherein at least a portion of movement of the first selection indicator occurs without concurrent user input;
receiving, via the one or more input devices, a first user input to stop movement of the first selection indicator;
responsive to receiving the first user input to stop movement of the first selection indicator, ceasing movement of the first selection indicator over a first location of the user interface;
while the first selection indicator is displayed over the first location of the user interface:
displaying a second selection indicator overlaid on the user interface,
moving the second selection indicator in a second direction, wherein at least a portion of movement of the second selection indicator occurs without concurrent user input, and
receiving, via the one or more input devices, a second user input to stop movement of the second selection indicator;
responsive to receiving the second user input to stop movement of the second selection indicator, ceasing movement of the second selection indicator over a second location of the user interface; and
determining a respective location as a user-selected location of the user interface based at least in part on the first location that was determined based on the first user input to stop movement of the first selection indicator and the second location that was determined based on the second user input to stop movement of the second selection indicator of the user interface.

2. The method of claim 1, further comprising:
while moving the first selection indicator in the first direction, prior to receiving the first user input, determining that a respective edge of the first selection indicator is within a first specified distance of a boundary of the user interface; and
responsive to the determining, reversing movement of the first selection indicator on the user interface, by moving a displayed portion of the first selection indicator in a direction opposite to the first direction.

3. The method of claim 1, wherein the second selection indicator comprises a line lying within a region associated with the first location, the method further comprising:
moving a third selection indicator along a movement trajectory defined by the line;
responsive to receiving a third user input to stop movement of the third selection indicator, ceasing movement of the third selection indicator over a third location of the user interface; and
determining the user-selected location of the user interface based at least in part on the third location of the user interface.

4. The method of claim 1, wherein:
the first selection indicator is a first rectangular visually distinguished region extending between a first pair of parallel edges; and the first direction is orthogonal to the first pair of parallel edges.

5. The method of claim 4, wherein:
the second selection indicator is a second rectangular visually distinguished region extending between a second pair of parallel edges;
the second pair of parallel edges is orthogonal to the first pair of parallel edges; and
the second direction is orthogonal to the first direction.

6. The method of claim 4, wherein:
the second selection indicator comprises a straight line lying between and parallel to the first pair of parallel edges;
the second direction is parallel to the first direction; and
movement of the second selection indicator is confined between the first pair of parallel edges.

7. The method of claim 6, further comprising:
moving a third selection indicator along the straight line;
responsive to receiving a third user input to stop movement of the third selection indicator, ceasing movement of the third selection indicator over a third location of the user interface; and
determining the user-selected location of the user interface based at least in part on the third location of the user interface.

8. The method of claim 1, wherein moving the first selection indicator in the first direction comprises:
responsive to determining that a respective leading edge of a first pair of parallel edges is within a first specified distance of a boundary of the user interface, ceasing to display the respective leading edge and a first portion of the first selection indicator on the user interface;
continuing to display a second portion of the first selection indicator and a respective trailing edge of the first pair of parallel edges on the user interface;
moving the respective trailing edge toward the boundary of the user interface in the first direction; and
responsive to determining that the respective trailing edge is within a second specified distance of the boundary of the user interface, ceasing movement of the respective trailing edge toward the boundary in the first direction.

9. The method of claim 8, further comprising:
after a specified interval of time of ceasing movement of the respective trailing edge, in the absence of the first user input, reversing movement of the first selection indicator on the user interface, by moving the respective trailing edge and a displayed portion of the first selection indicator in a fourth direction, the fourth direction being parallel and opposite to the first direction.

10. The method of claim 1, further comprising:
visually emphasizing a first pair of edges of the first selection indicator against varying local background conditions of the user interface in a vicinity of the first selection indicator, by selecting display parameters of the first pair of edges to contrast against both a maximum and a minimum value of a display property of the background region of the user interface.

11. The method of claim 1, further comprising:
visually emphasizing one or more user interface elements located on the user interface within a region associated with the first selection indicator.

12. The method of claim 1, further comprising:
selecting a user interface element lying within a specified proximity threshold of the user-selected location of the user interface.

13. The method of claim 1, further comprising:
providing, via a selection panel, one or more selectable options to enable a user to interact with the user-selected location of the user interface.

14. The method of claim 1, wherein:
displaying the first selection indicator overlaid on the user interface comprises displaying the first selection indicator within an area of an application window displayed on the user interface, the area of the application window corresponding to a subregion of the user interface; and
moving the first selection indicator comprises moving the selection indicator within the area of the application window.

15. The method of claim 1, wherein the first selection indicator overlays an area of the user interface having a geometry: approximating a rectangle, approximating a polygon, approximating an angular wedge, or approximating a circle.

16. The method of claim 1, further comprising:
while the respective location is the user-selected location, receiving, via the one or more input devices, a third user input corresponding to a request to perform a respective action; and
in response to receiving the third user input, performing the respective action at the respective location.

17. A computer-program product comprising a non-transitory computer readable storage medium storing executable code, the code when executed causes a processor to:
while a first selection indicator is overlaid on the user interface, move the first selection indicator in a first direction, wherein at least a portion of movement of the first selection indicator occurs without concurrent user input;
receive a first user input to stop movement of the first selection indicator;
responsive to receiving the first user input to stop movement of the first selection indicator, cease movement of the first selection indicator over a first location of the user interface;
while the first selection indicator is displayed over the first location of the user interface:
display a second selection indicator overlaid on the user interface,
move the second selection indicator in a second direction, wherein at least a portion of movement of the second selection indicator occurs without concurrent user input, and
receive a second user input to stop movement of the second selection indicator;
responsive to receiving the second user input to stop movement of the second selection indicator, cease movement of the second selection indicator over a second location of the user interface; and
determine a respective location as a user-selected location of the user interface based at least in part on the first location that was determined based on the first user input to stop movement of the first selection indicator and the second location that was determined based on the second user input to stop movement of the second selection indicator of the user interface.

18. A computer system comprising:
a computer processor; and
a computer readable storage medium storing executable code, the code when executed causes the computer processor to:
while a first selection indicator is overlaid on the user interface, move the first selection indicator in a first direction, wherein at least a portion of movement of the first selection indicator occurs without concurrent user input;
receive a first user input to stop movement of the first selection indicator;
responsive to receiving the first user input to stop movement of the first selection indicator, cease movement of the first selection indicator over a first location of the user interface;
while the first selection indicator is displayed over the first location of the user interface:
display a second selection indicator overlaid on the user interface,
move the second selection indicator in a second direction, wherein at least a portion of movement of the second selection indicator occurs without concurrent user input, and receive a second user input to stop movement of the second selection indicator;

responsive to receiving the second user input to stop movement of the second selection indicator, cease movement of the second selection indicator over a second location of the user interface; and determine a respective location as a user-selected location of the user interface based at least in part on the first location that was determined based on the first user input to stop movement of the first selection indicator and the second location that was determined based on the second user input to stop movement of the second selection indicator of the user interface.

* * * * *